Jan. 8, 1963     W. D. HAILES     3,072,785
REMOTE CONTROL SYSTEM FOR VEHICLES
Filed April 21, 1960     20 Sheets-Sheet 1
FIG. 1.
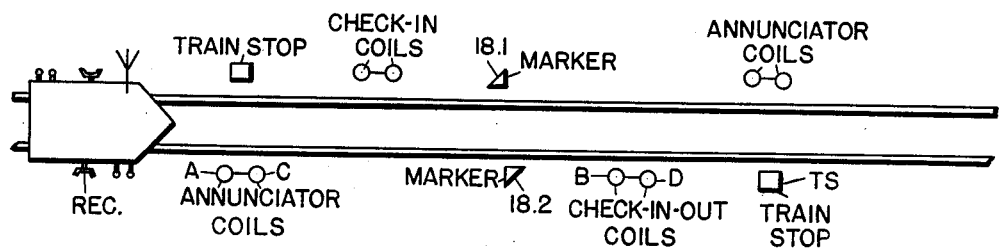
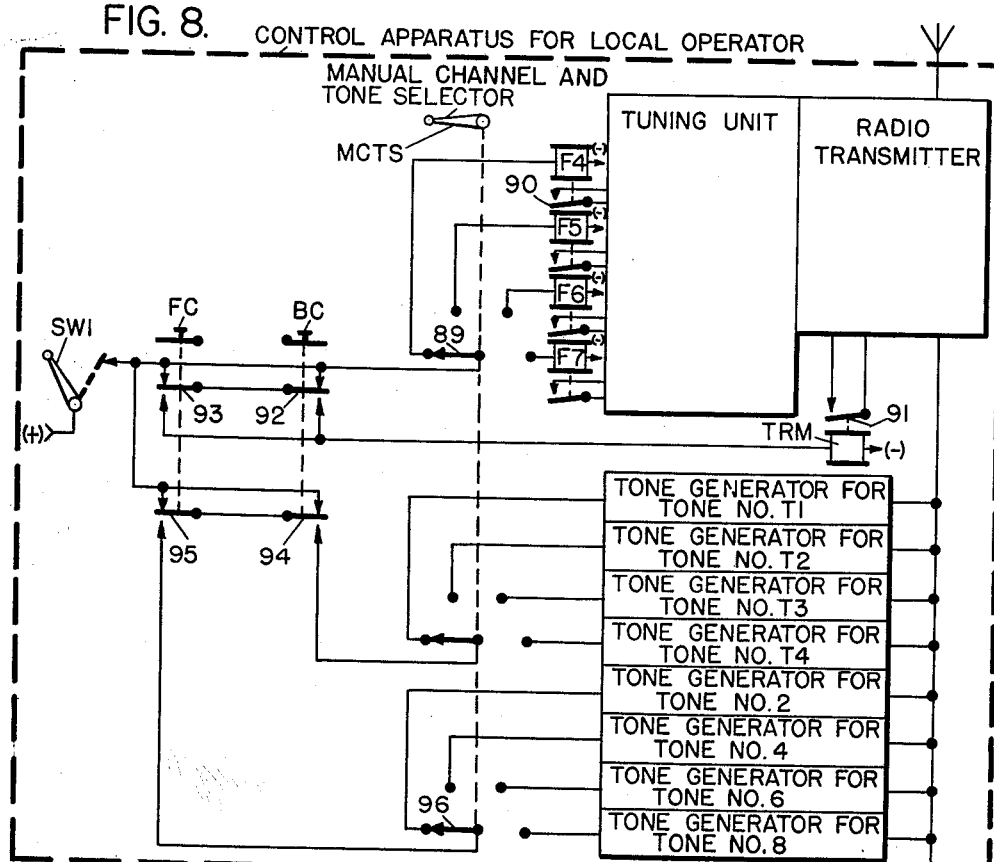
INVENTOR.
W. D. HAILES
BY
HIS ATTORNEY

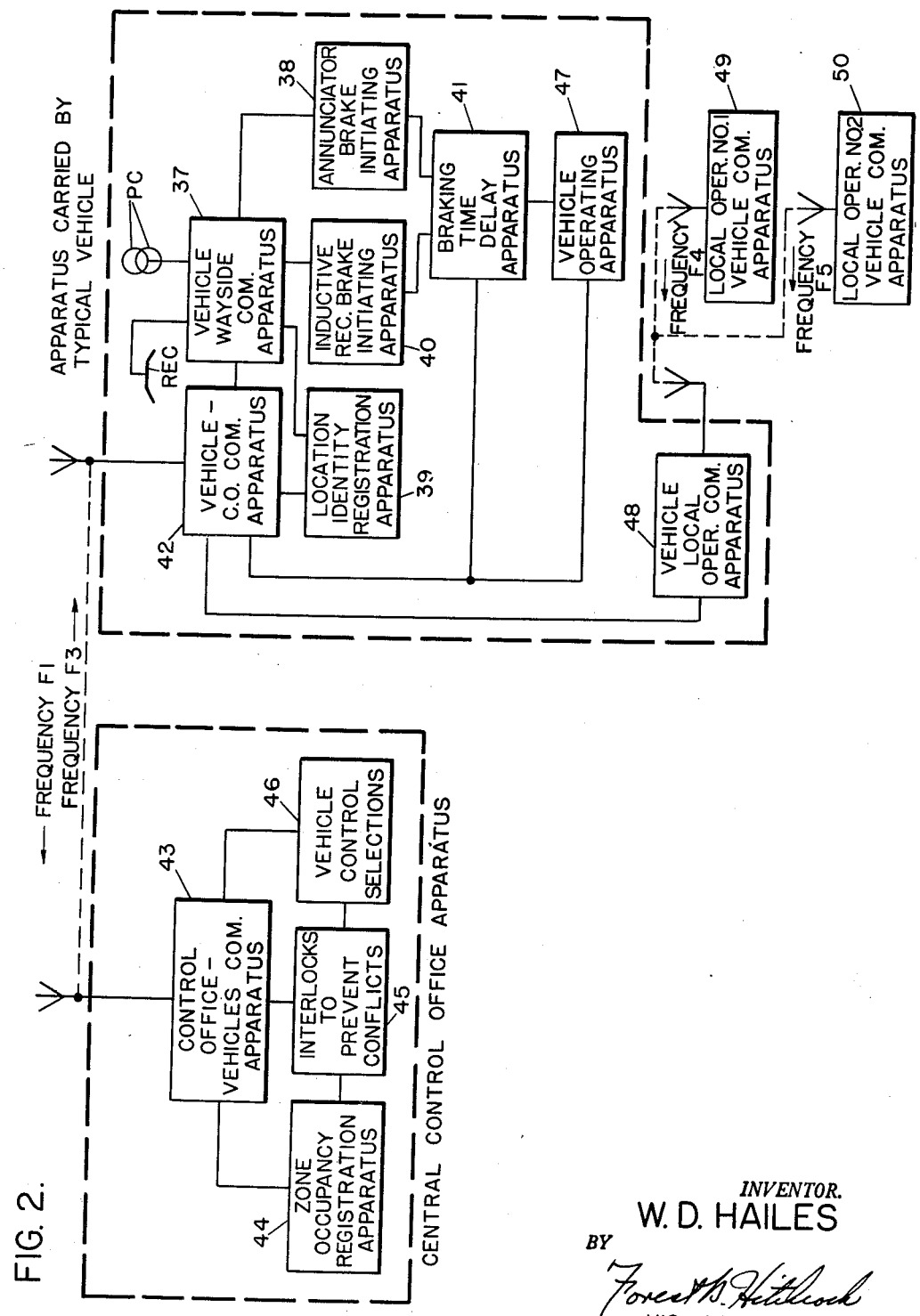

Jan. 8, 1963 W. D. HAILES 3,072,785
REMOTE CONTROL SYSTEM FOR VEHICLES
Filed April 21, 1960 20 Sheets-Sheet 3

| FIG. 3A | FIG. 3B | FIG. 3C | FIG. 3D | FIG. 3E | FIG. 3F |
|---------|---------|---------|---------|---------|---------|
| FIG. 3G | FIG. 3H |         |         |         |         |

*INVENTOR.*
W. D. HAILES
BY
*Forest B. Hitchcock*
HIS ATTORNEY

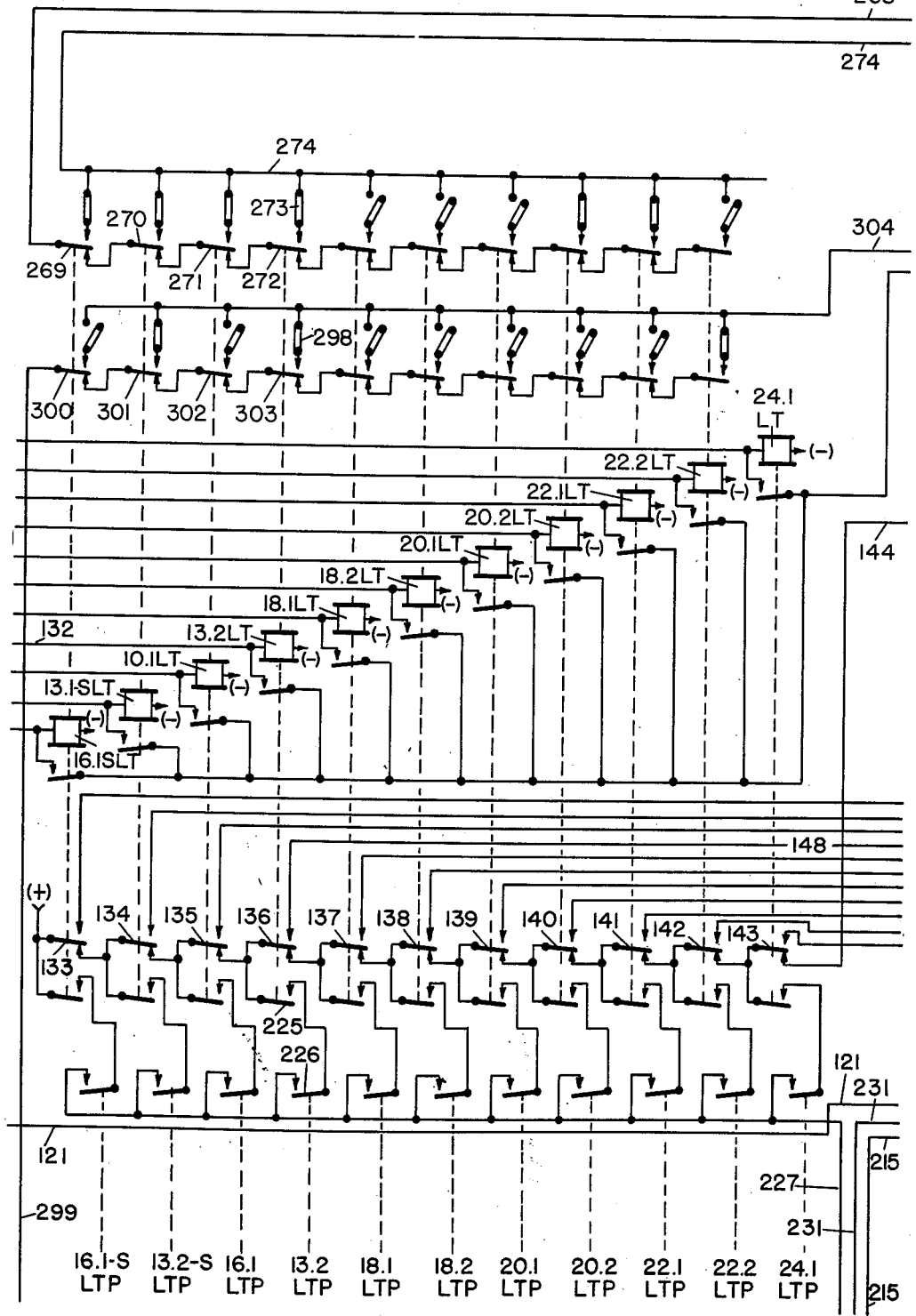

Jan. 8, 1963 W. D. HAILES 3,072,785
REMOTE CONTROL SYSTEM FOR VEHICLES
Filed April 21, 1960 20 Sheets-Sheet 5

INVENTOR.
W. D. HAILES
BY
*Forest D. Hitchcock*
HIS ATTORNEY

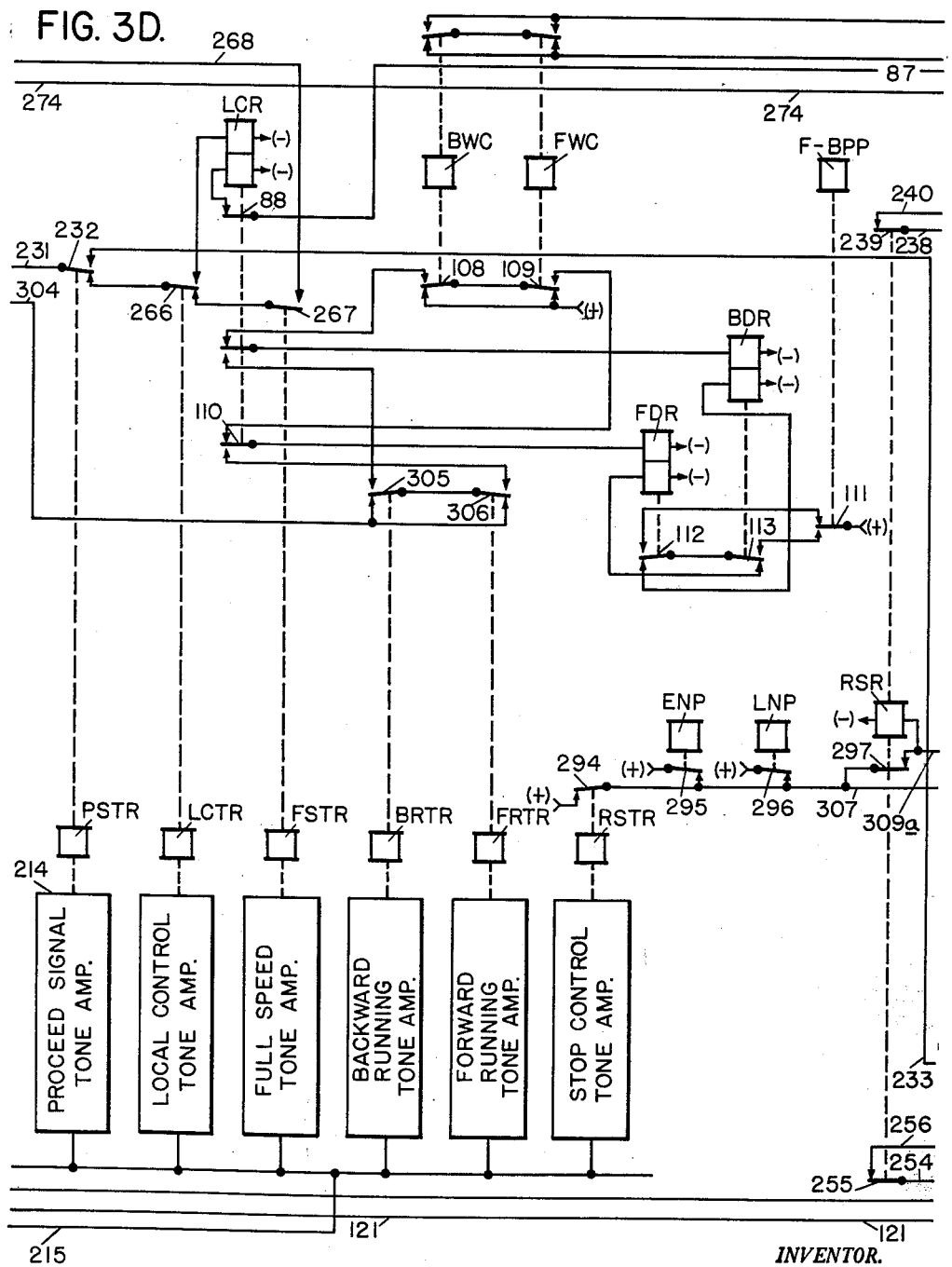

INVENTOR.
W. D. HAILES

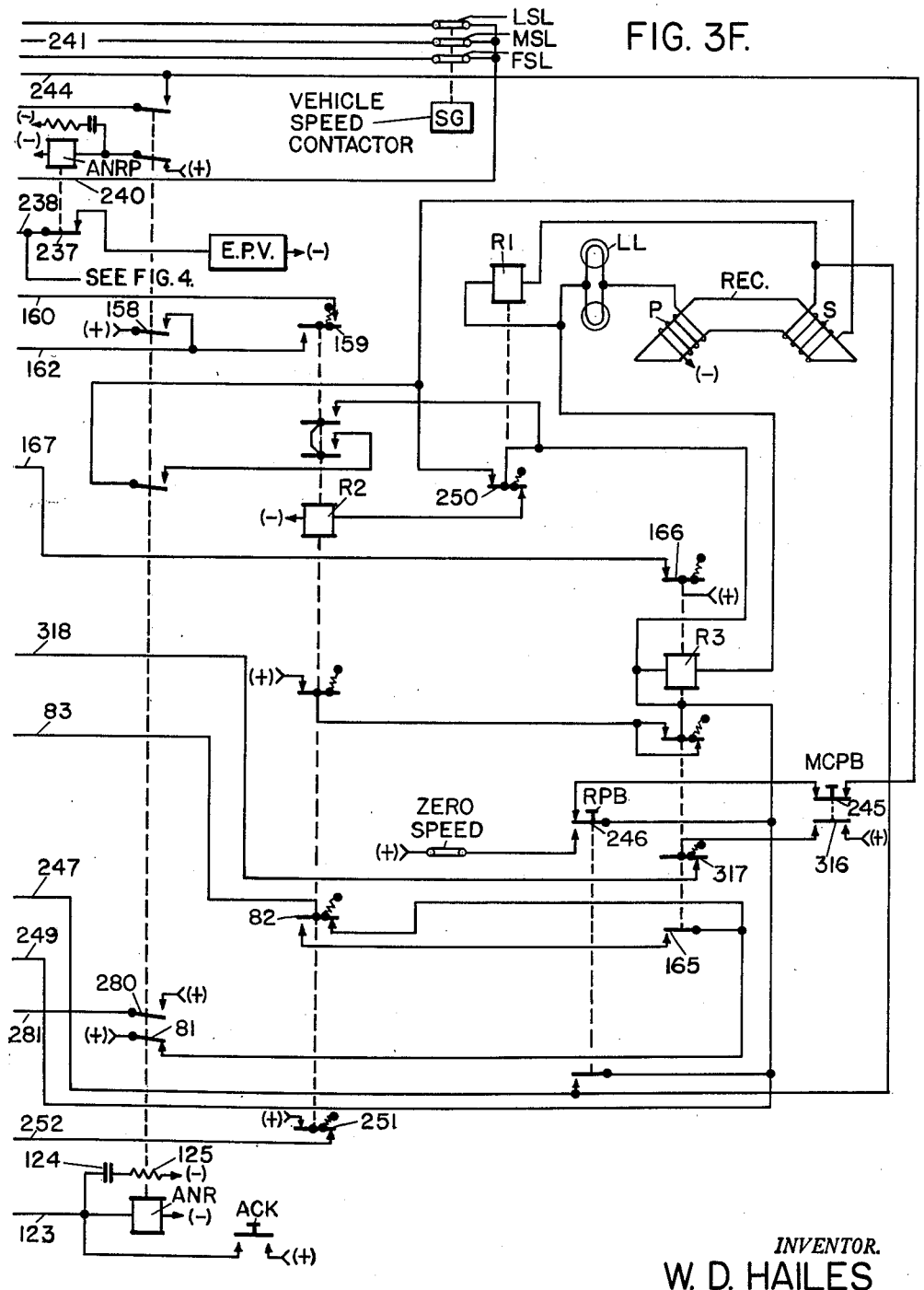

INVENTOR.
W. D. HAILES

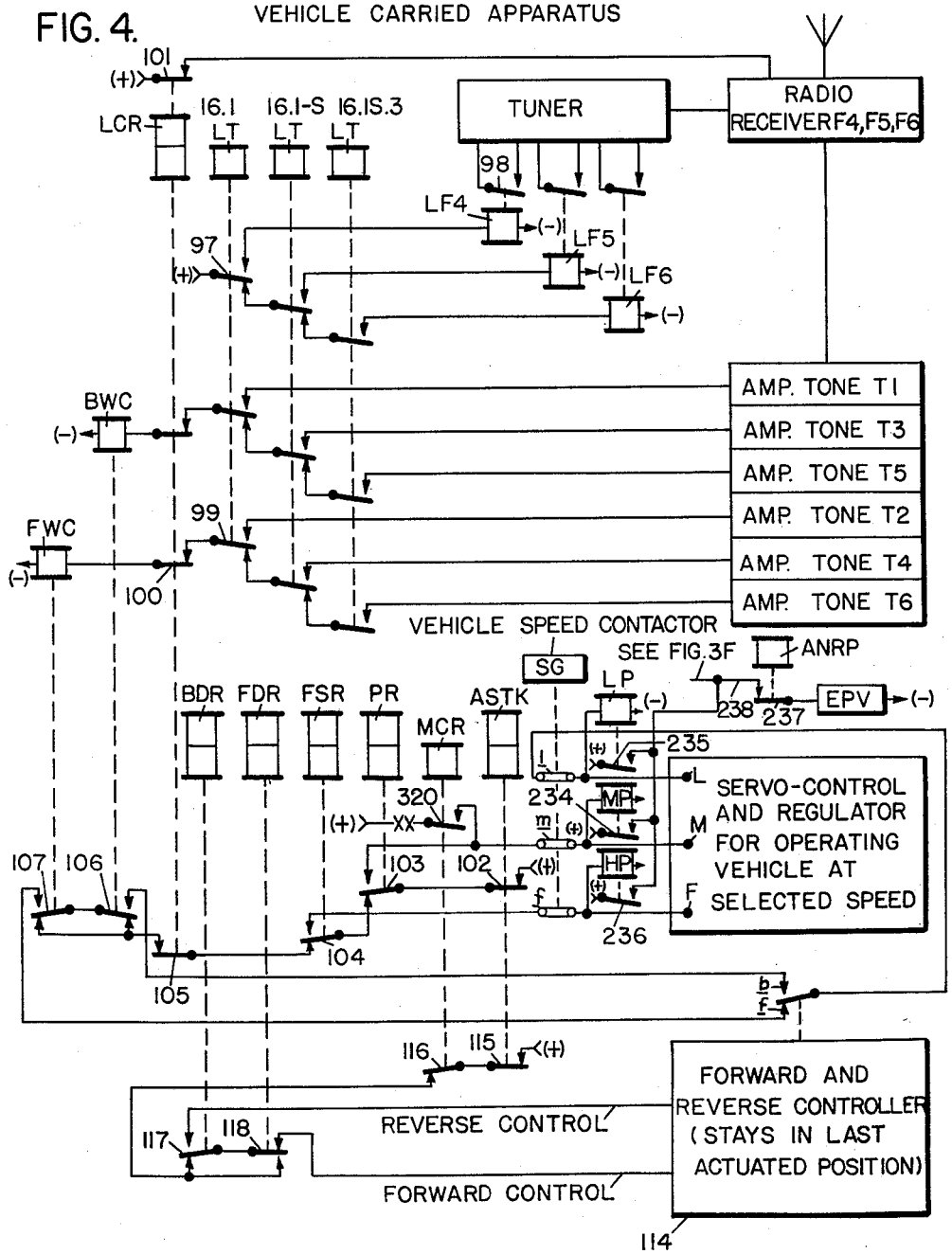

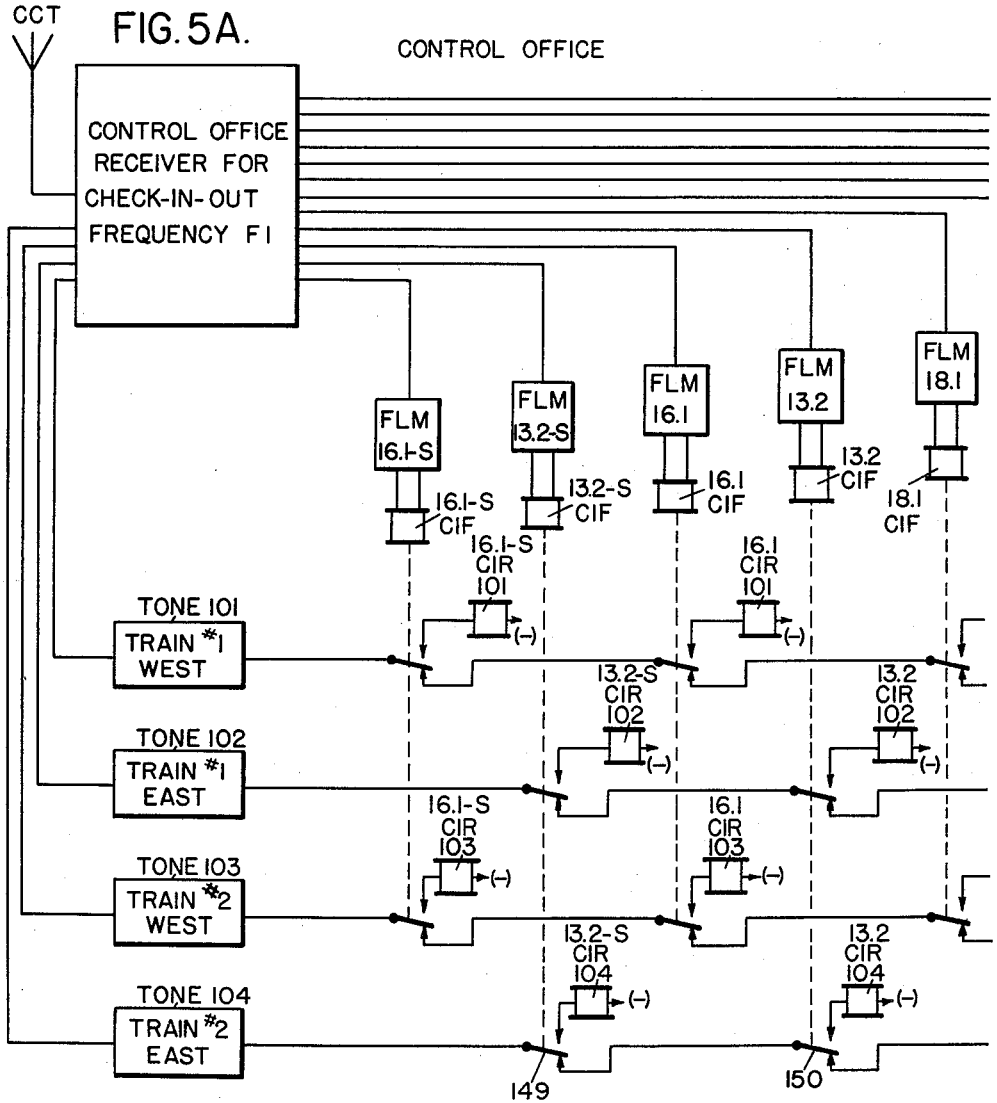

Jan. 8, 1963 W. D. HAILES 3,072,785
REMOTE CONTROL SYSTEM FOR VEHICLES
Filed April 21, 1960 20 Sheets-Sheet 13

INVENTOR.
W. D. HAILES
BY
*Forest B. Hitchcock*
HIS ATTORNEY

Jan. 8, 1963 W. D. HAILES 3,072,785
REMOTE CONTROL SYSTEM FOR VEHICLES
Filed April 21, 1960 20 Sheets-Sheet 14

INVENTOR.
W. D. HAILES
BY
Forest H. Hitchcock
HIS ATTORNEY

Jan. 8, 1963

W. D. HAILES 3,072,785

REMOTE CONTROL SYSTEM FOR VEHICLES

Filed April 21, 1960

INVENTOR.
W. D. HAILES
BY
*Forest B. Hitchink*
HIS ATTORNEY

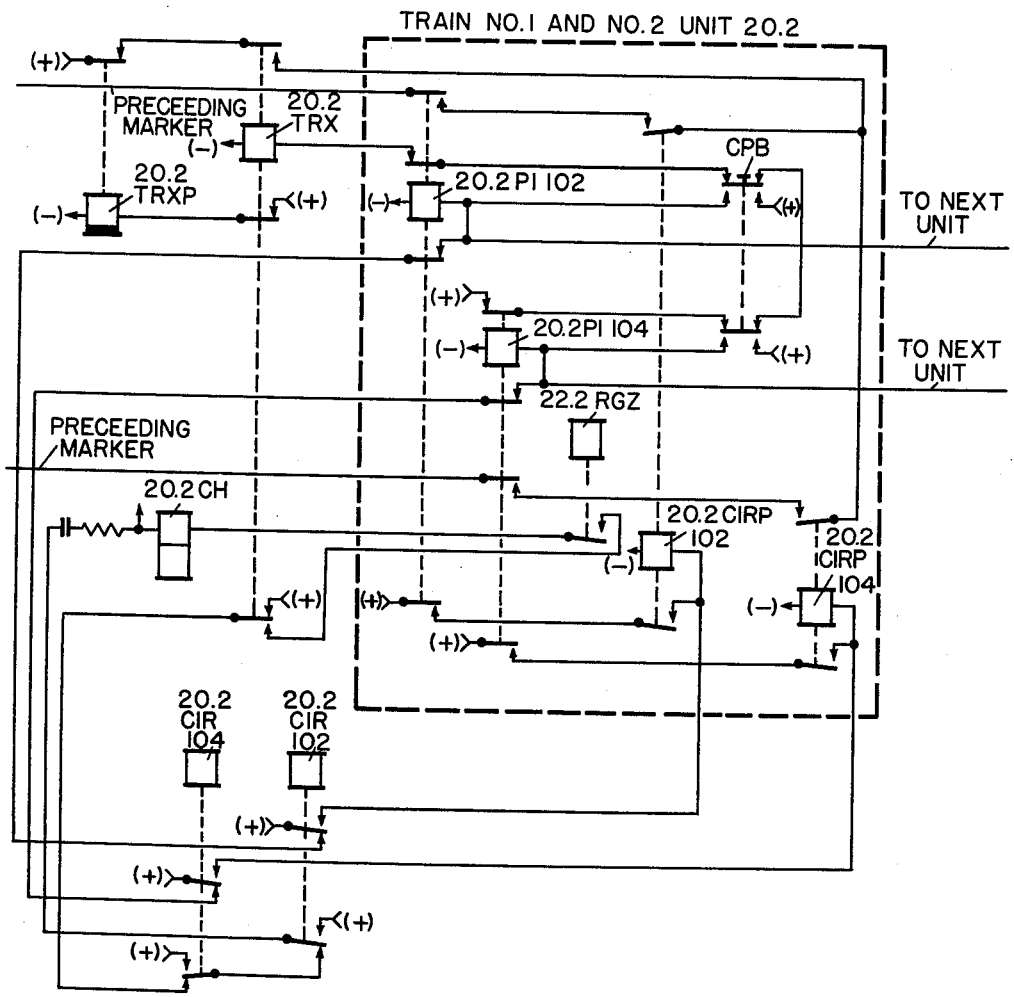

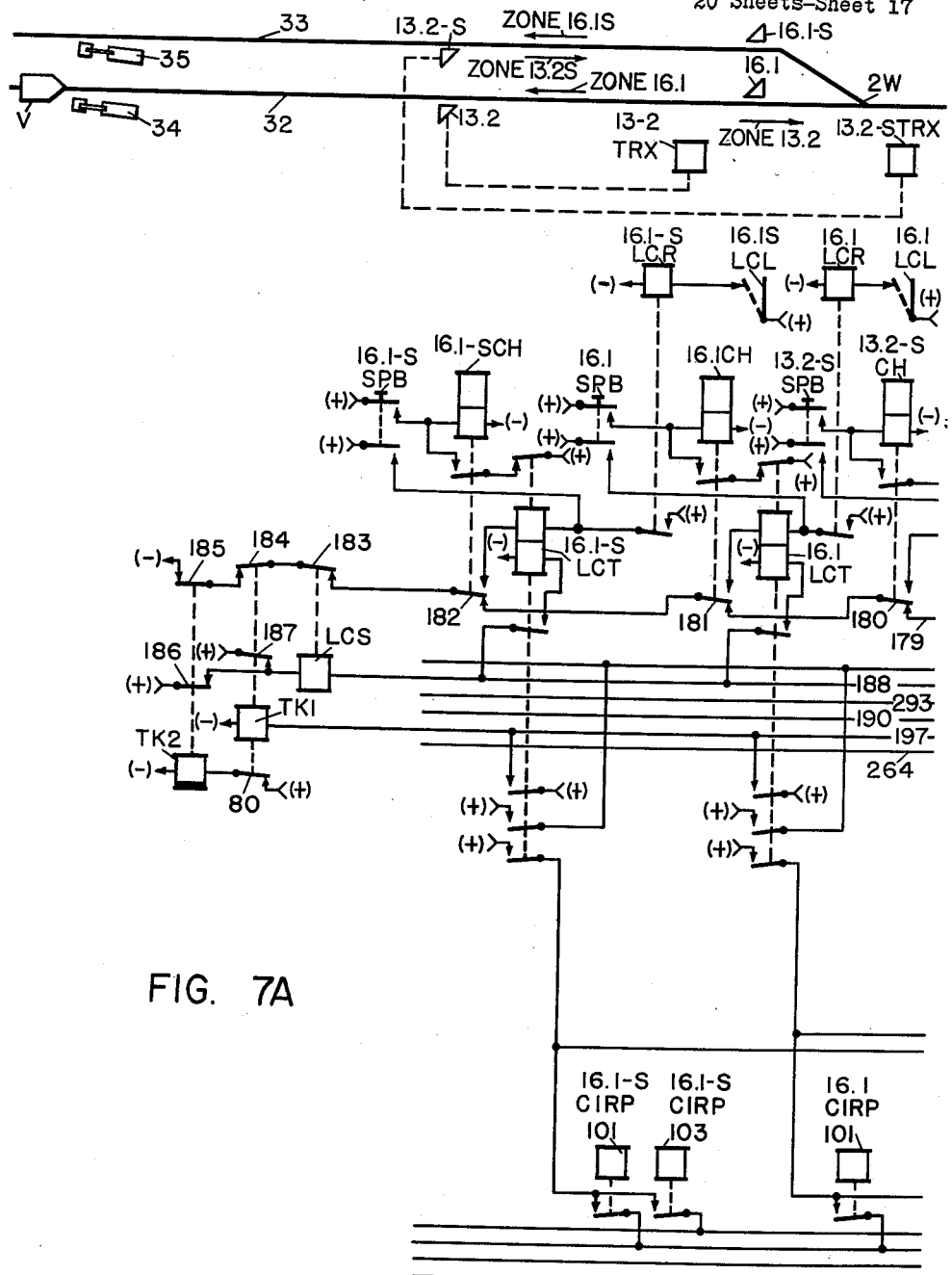

Jan. 8, 1963  
W. D. HAILES  
3,072,785  
REMOTE CONTROL SYSTEM FOR VEHICLES  
Filed April 21, 1960  
20 Sheets-Sheet 18

INVENTOR.  
W. D. HAILES  
BY  
HIS ATTORNEY 3,072,785
REMOTE CONTROL SYSTEM FOR VEHICLES
William D. Hailes, Rochester, N.Y., assignor to General
Railway Signal Company, Rochester, N.Y.
Filed Apr. 21, 1960, Ser. No. 23,664
21 Claims. (Cl. 246—177)

This invention relates to the remote control from a control office of the passage of vehicles along a right of way, and it more particularly pertains to such a system wherein operators are not required on the vehicles, and wherein fail-safe controls for the vehicles are provided without the use of continuous inductive wayside currents, track circuits, or the like.

This invention provides improvements in the centralized zone control system according to my prior U.S. patent application Ser. No. 730,596, filed April 24, 1958. The system according to this prior application provides for the automatic control of the brakes of a train by an intermittent inductive brake control system, but it requires the presence of an operator on the train to perform functions of acknowledgement of zone and location points, and manual actuation of controls for starting and for throttle control of a locomotive. The system provided by the present invention provides for the safe operation of trains or other vehicles without operators being required for the vehicles. Provision is made for operation of vehicles over a right of way without the use of continuous wayside control energy such as coded loops, track circuits or the like.

The right of way over which the vehicles are operated, according to the present invention, is divided into zones, and the ends of the zones are conveniently called location points. At each of the location points, there is disposed, for each direction of traffic, annunciator coils, location identifying coils, and an intermittent inductive stop inductor. Each vehicle carries intermittent inductive brake control apparatus and additional apparatus cooperating with the annunciator and location point identifying coils for registering the reception of wayside stop controls and the identity of each location point that the vehicle passes. In addition, the system provides two-way communication means for communicating identities to a central control office from the vehicles and for communicating controls from the control office to the respective vehicles. These controls are selected by an operator at the control office, subject to a safety circuit interlocking organization, for causing selected forward and reverse operation of each of the vehicles and for the control of the speed and stopping of the vehicles in accordance with supervisory control.

The two-way communication between a vehicle and the control office is rendered effective in response to the passage of a vehicle past each location point. The particular controls communicated to the vehicle from the control office are in the form of selected tones applied to a suitable carrier. The tones are preselected at the control office by an operator of a control machine. The reception on the vehicle of control tones communicated from the control office in this manner may be executed for the operation of the vehicle, only provided two independently communicated stop controls have both been properly received by the vehicle from a particular location point which the vehicle has just passed. This checks the integrity of the wayside to vehicle stop communication apparatus. One of these stop controls is in the form of proper registration by actuation of a relay on the vehicle in response to the passage of the vehicle past a wayside annunciator coil, and the other of these stop controls is in the form of proper registration by actuation of a relay on the vehicle in response to the passage of a wayside train control inductor. In other words, each time a vehicle passes a location point, two stop controls are communicated by independent apparatus from each location point to the vehicle, and each of these controls will be effective to stop the vehicle in case the other control is not received, irrespective of any control tones communicated from the control office for permitting the vehicle to proceed; but after the integrity of this stop control apparatus is checked, the reception of a proceed control tone from the control office will prevent application of the brakes.

The timing of the wayside stop control communication apparatus and the communication of proceed controls from the control office is such that the actual application of the brakes on the vehicle is delayed upon communication of the wayside stop controls until sufficient time has elapsed for the communication from the control office of a proceed control to over-ride the stop controls which are inherently set up upon passage of each location point. It will therefore be apparent that if a vehicle is to continue to progress through the several zones, a new proceed control must be received by the train carried equipment promptly upon entering each new zone. Furthermore, the stop control apparatus will have been initiated by two independent sources upon entering each zone, and the execution of a proceed control is dependent upon the integrity of the apparatus for the communication of each of these stop controls. Only if the integrity check is properly made at each location point, is the vehicle permitted to enter a zone without brake application in response to a proceed control communicated from the control office.

The traffic control system according to the present invention does not require check-out controls as in my above mentioned prior application because the check-in and check-out operations are both performed at the same time according to the present invention. It is therefore assumed according to the present invention that the vehicles are integral units that are either inseparable or will not become separated in passage over the right of way, thus making it unnecessary to check that a part of the train has been left in a preceding zone. Such vehicles can be in the form of ore trains, for example, which always operate as an integral unit, and generally with substantially the same number of cars. If the trains are considered to be all of substantially the same length, the location of the train carried coils for determining the identities of wayside locations can be on the last car of each train, and the wayside identity coils can be so located as to communicate the identity or address of each location at the time when the last car passes the location, and each zone is made long enough to provide safe braking distance plus the length of the train.

In addition to the system according to the present invention providing supervisory control of vehicle operations by an operator of a centralized traffic control machine, provision is made so that the centralized traffic control machine operator can transfer control of a vehicle to a local operator at the location of mining activities for spotting the vehicle and general local operation as for loading ore cars. Further provision is made to permit a plurality of local operators to control vehicles in their respective associated zones of operation independently by use of communication apparatus having different communication frequencies.

An object of the present invention is to provide a safe intermittent system for the remote supervisory control of vehicles without operators proceeding along a right of way wherein continuous communication with the vehicles is not required.

Another object of the present invention is to make the remote control of vehicles without operators safe by communicating a plurality of stop controls by independent apparatus intermittently along the right of way and checking the integrity of this apparatus before permitting the vehicles to proceed further without brake application.

Another object of the present invention is to make the progress without brake application beyond each location point dependent upon an integrity check of a plurality of wayside vehicle stop communication means and also dependent upon reception shortly after this integrity check of a proceed control communicated from the control office.

Another object of the present invention is to selectively remotely control vehicles from a plurality of different control offices.

Another object of the present invention is to limit the communication of operating controls to a vehicle from a control office in accordance with a registered identity of the location of the vehicle.

Another object of the present invention is to limit the execution of operating controls on a vehicle which are communicated from a remote point in accordance with vehicle carried registration of the location of the vehicle.

Other objects, purposes and characteristic features of the present invention will be in part obvious from the accompanying drawings and in part pointed out as the description of the invention progresses.

In describing the invention in detail, reference is made to the accompanying drawings in which similar letter reference characters are used to designate apparatus having similar functions but associated with different locations, and in which:

FIG. 1 is a diagram illustrating the location at a typical wayside location point of coils and inductors for communication with passing vehicles;

FIG. 2 is a block diagram of a remote control system for vehicles illustrating one embodiment of the organization of apparatus at a control office and apparatus carried by a typical vehicle and apparatus at a plurality of local control points for remotely controlling the operation of vehicles;

Figures 3A, 9:
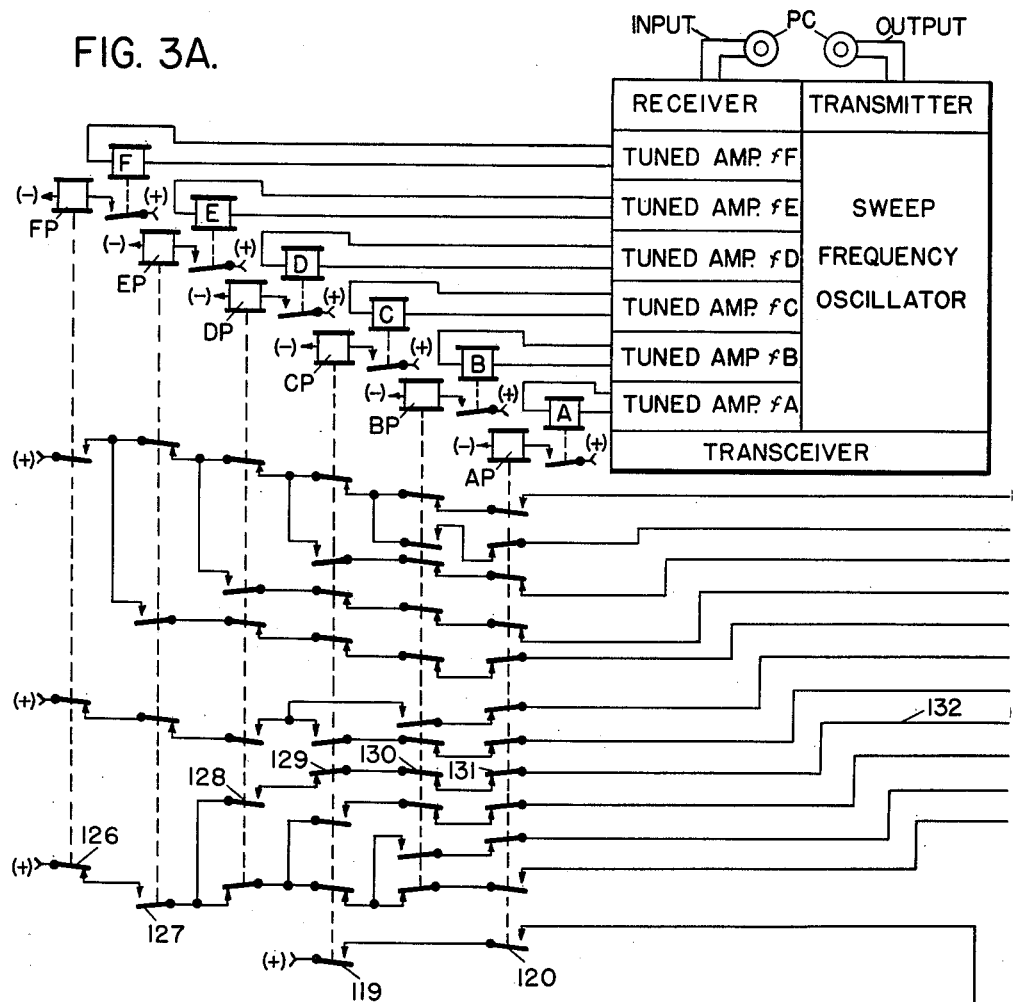
Figure 5B:
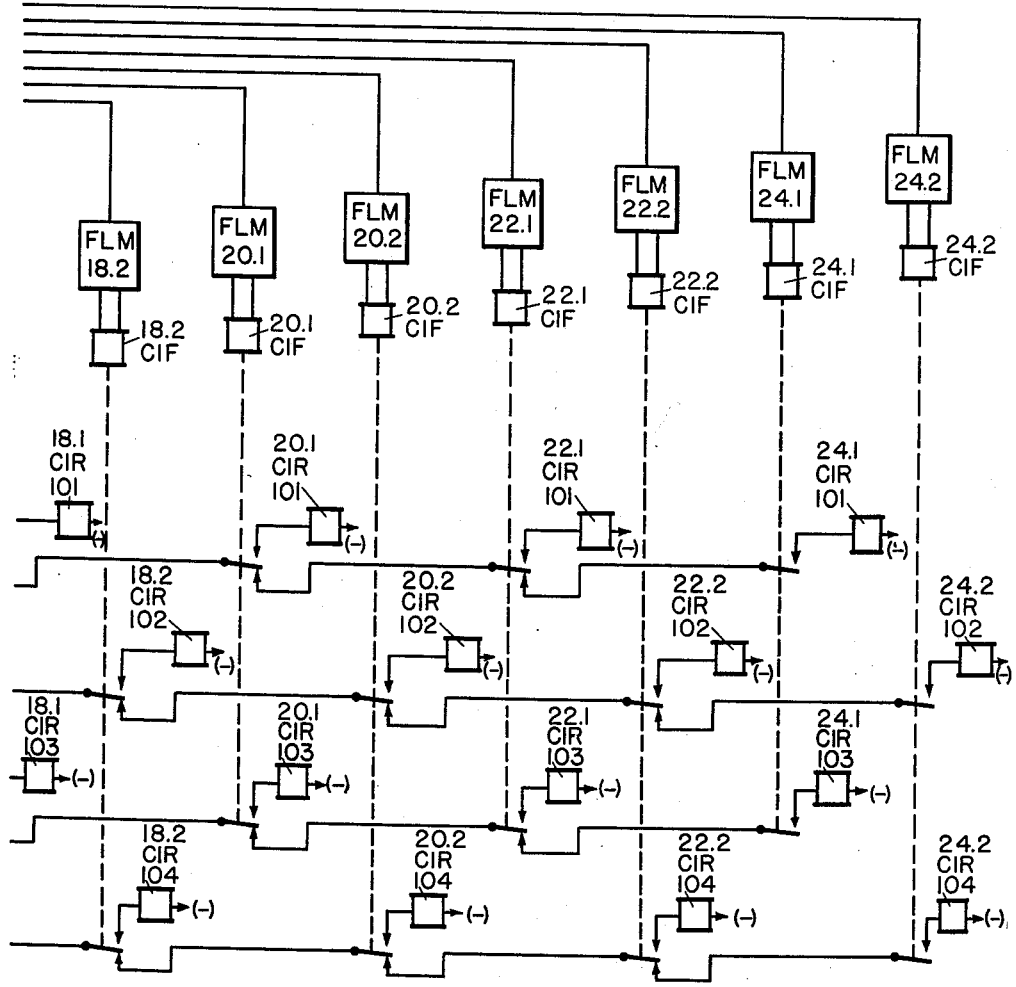
Figure 6A:
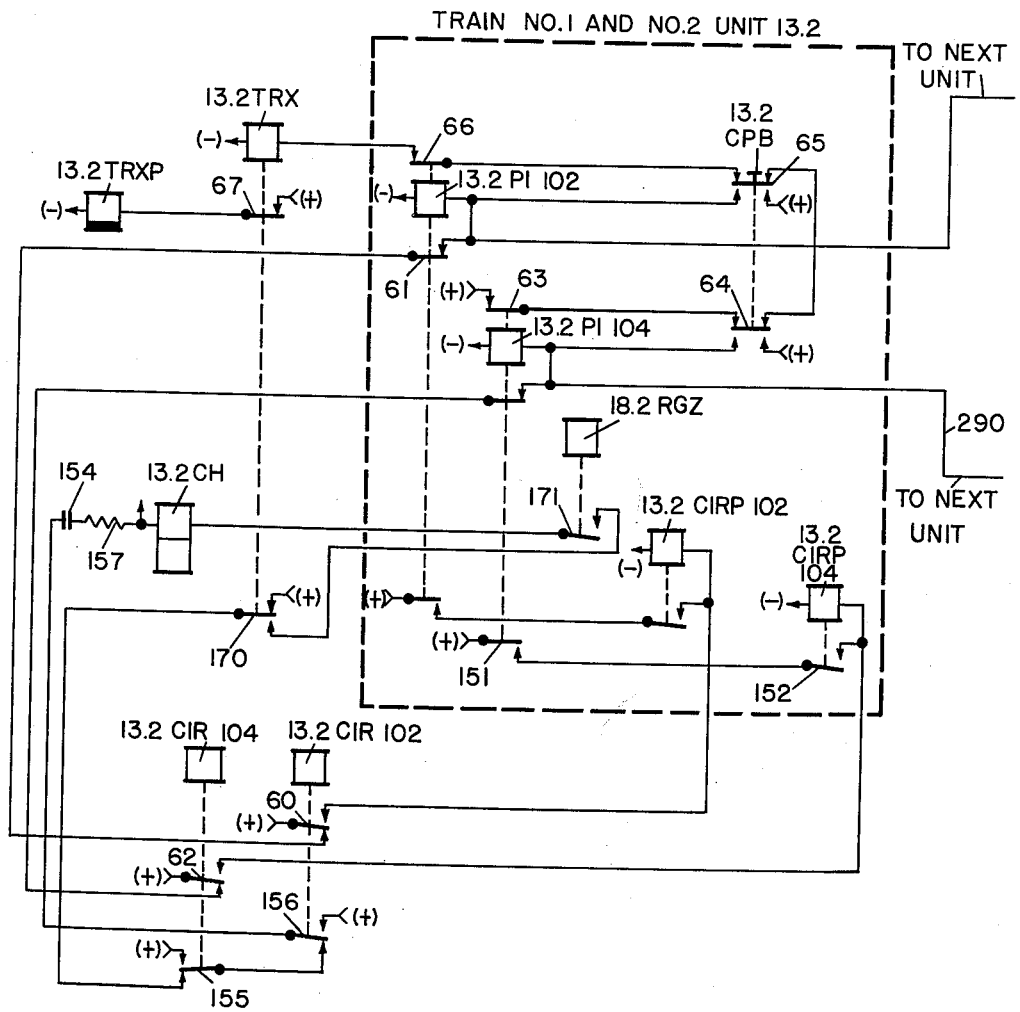
Figure 6B:
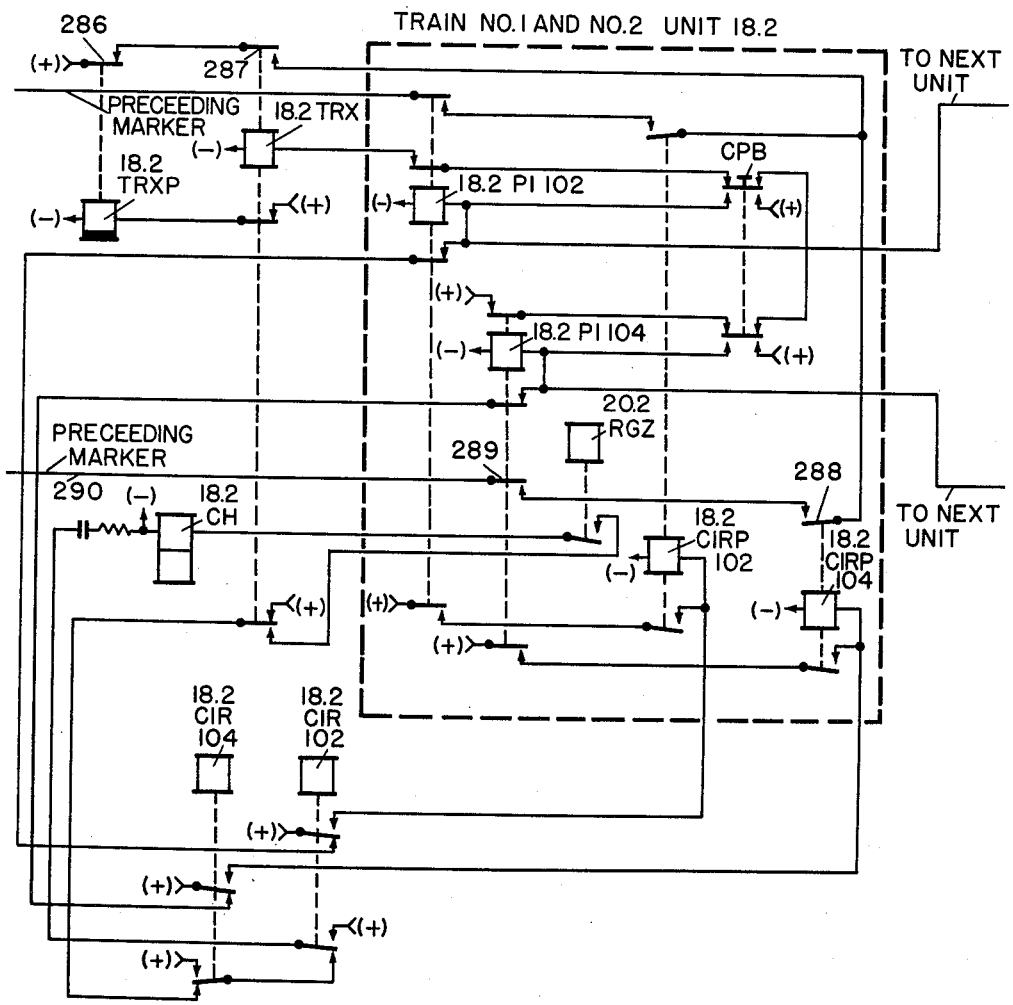

FIGS. 3A through 3F when placed side by side and FIGS. 3G and 3H when placed side by side below FIGS. 3A and 3B illustrate vehicle carried train control and communication apparatus for one embodiment of the present invention;

FIG. 4 illustrates vehicle carried apparatus for selectively governing operation of a typical vehicle in accordance with control tones received from a central control office or from a local operator;

FIGS. 5A and 5B when placed side by side illustrate apparatus at the control office for receiving and registering location identities communicated from the several vehicles;

FIGS. 6A, 6B and 6C when placed side by side illustrate typical apparatus at a control office for registering occupancy of the several zones in accordance with location identity tones communicated from typical eastbound trains;

FIGS. 7A, 7B, 7C and 7D when placed side by side illustrate apparatus at the control office for transmitting selected controls from the control office to the vehicles;

FIG. 8 illustrates control apparatus for use by a local operator in the remote control of vehicles in his particular zone of operation; and, FIG. 9 is an arrangement diagram for the FIGS. 3A through 3H.

For the purpose of simplifying the illustrations and facilitating in the explanation thereof, the various parts and circuits constituting this embodiment of the present invention have been shown diagrammatically in an arrangement to more particularly facilitate an understanding of the mode of operation of the system and the principles involved, rather than to attempt to point out all of the necessary details of construction and the specific arrangement of components that may be provided by those skilled in the art in accordance with the requirements of practice.

The symbols (+) and (−) have been used to indicate connections to the positive and negative terminals respectively of suitable batteries or other sources of direct current.

Figure 7B:
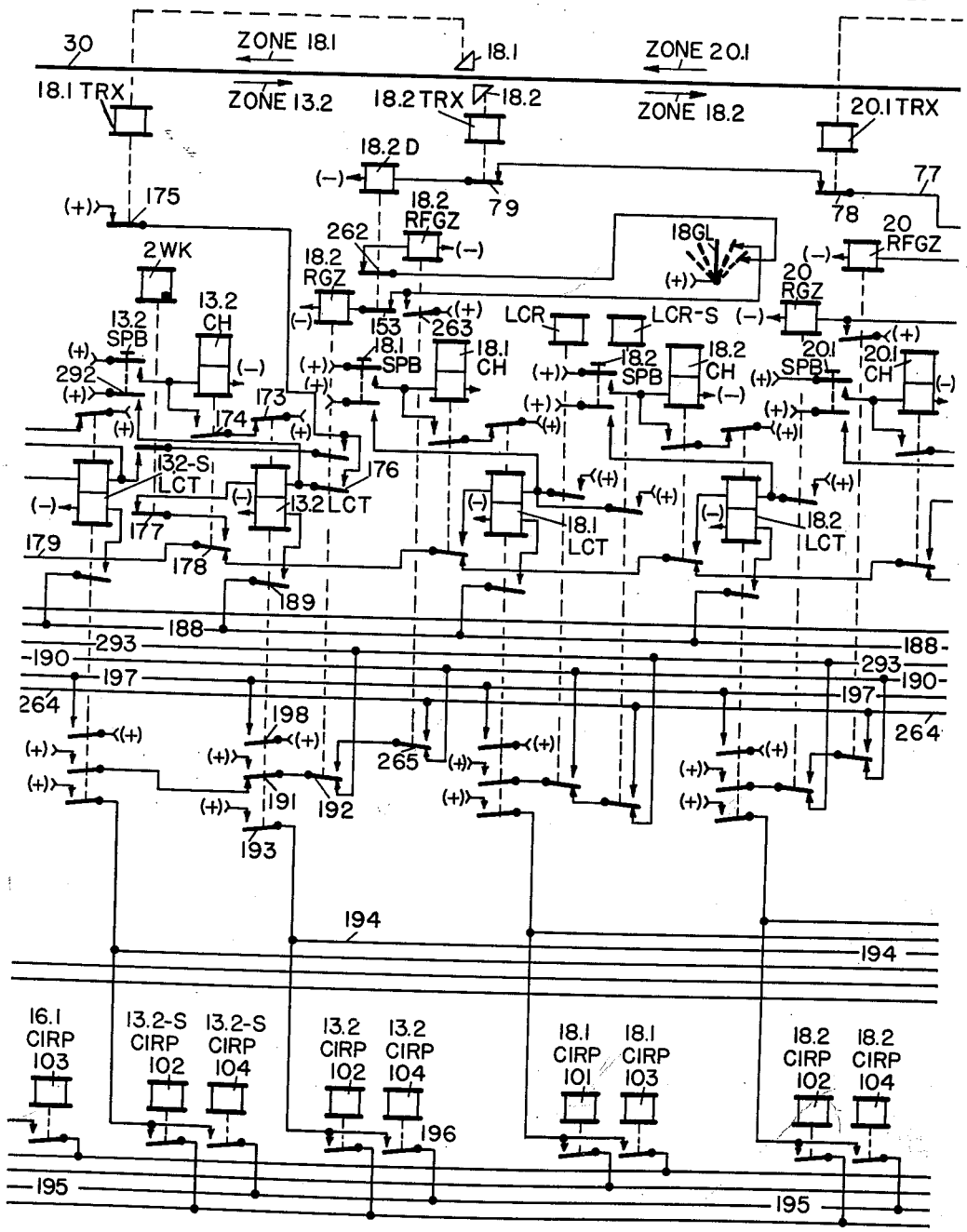

Although the present invention will be readily understood as being applicable to a number of different track layouts having either single or double direction running, the invention has been illustrated as being applied to a typical stretch of single track having a typical passing siding associated therewith, the stretch of single track extending to a plurality of work areas. Such a track layout is particularly typical of a track layout found in a mining operation wherein ore cars are loaded at different mining locations, and the ore trains are remotely operated by a dispatcher at a central office to a refining plant, or other location where the ore is to be dumped. Thus, with reference to FIGS. 7A through 7D, the track layout for one embodiment of the present invention comprises a stretch of single track 30 having a passing siding 31 connected thereto by spring switches 3S and 4S. It is assumed that the spring 4S is set to route westbound (empty) ore trains through the passing siding, and the spring switch 3S is set to route eastbound ore trains (loaded) through the main stretch of track 30 associated with the passing siding 31 for the meeting of trains. With reference to FIG. 7A, the main track 30 is illustrated as terminating into the work tracks 32 and 33 wherein ore trains are loaded by excavation units 34 and 35 respectively. A routing of trains to the tracks 32 and 33 is selectively governed by the positioning of the power switch 2W. The track switch 2W is to be understood as being operated from a central control office in accordance with usual centralized traffic control practice.

The trackway of the track layout is divided into zones which may have their associated ends marked by suitable markers as indicated by triangular symbols disposed along the track diagram of FIGS. 7A to 7D. Inasmuch as the trains are remotely controlled without operators, the markers for marking location points at the ends of the zones have no particular significance as far as actual operation of the trains is concerned, and thus they may be eliminated if desired. At each of the location points, which may be marked by markers, apparatus is provided for communication with passing vehicles as is illustrated for a typical location point in FIG. 1. According to FIG. 1, a train passing a location point encounters wayside annunciator coils A and C, and there is a train carried receiver having apparatus distinctively responsive to a combination of tuned frequencies of these coils. Also disposed along the right of way at the typical location point illustrated in FIG. 1 are check-in-out coils B and D for eastbound traffic, which are tuned to frequencies for identifying that location point as being at the entrance end of zone 18.2 for eastbound traffic. Also disposed along the right of way at each location point for each direction of traffic is a train stop inductor TS which cooperates with a train carried receiver REC in a manner comparable to that in general practice for intermittent inductive train control.

For double direction running, as is illustrated in this embodiment of the present invention, similar location point apparatus is disposed on the opposite side of the track as is illustrated in FIG. 1 for cooperating with communication equipment carried by the trains. Inasmuch as the ore trains are assumed to travel selectively in forward and reverse directions, rather than being turned around for return trips, duplicate receivers are illustrated as being provided on both sides of each of the trains.

A zone identification transceiver (see FIG. 3A) is provided on each vehicle for communication with wayside apparatus to identify location points and to signify the passage of the vehicle past annunciator coils at each location. The pick up coils PC of the transceiver become inductively coupled with associated trackway inductive wayside coils upon passage of the vehicle past the wayside coils. The transceiver has amplifiers associated therewith tuned to become activated for respective distinctive frequencies. The transmitter portion of the transceiver includes a sweep frequency oscillator operable to sweep the band of frequencies within which the wayside coils are tuned.

Relays A through F are provided for each vehicle for registration of frequencies received by the several tuned amplifiers, and these relays have repeater relays AP through FP respectively associated therewith.

Relays LT are provided on each vehicle for the several zones for registration of the identities of the several zones in accordance with tones received by the transceiver upon passage past the several location points.

The vehicle also carries conventional intermittent inductive train control receiving apparatus having a receiver REC which cooperates inductively with wayside train stop inductors TS for communication of stop controls to the vehicle at the respective location points. As has been heretofore pointed out, the above described apparatus is provided in duplicate for communicating with wayside apparatus at the location points when the vehicle is considered to be operated selectively in both directions.

Figure 3C:
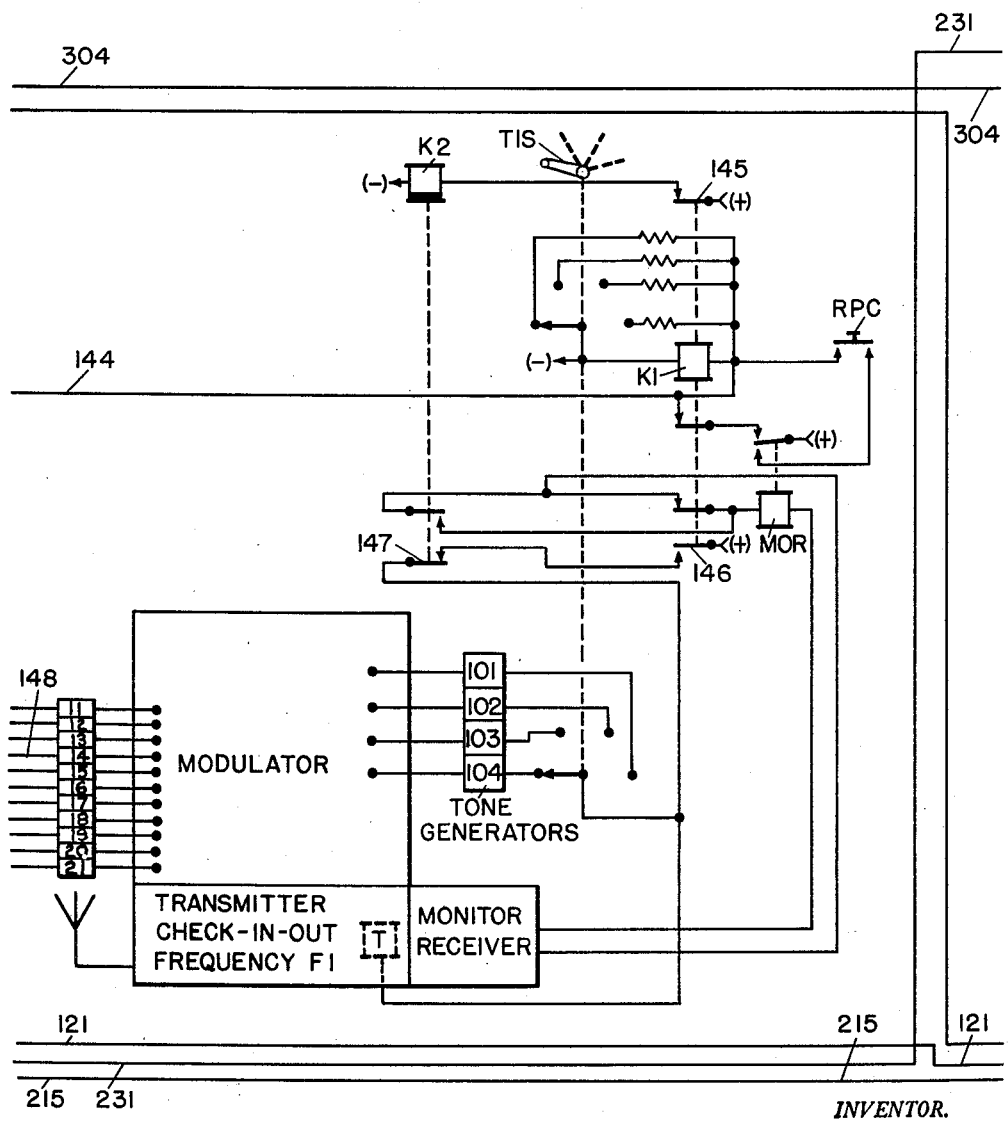

For the purpose of communicating train and location identities from each vehicle to the control office, the equipment of each vehicle includes a radio transmitter as is illustrated in FIG. 3C for transmitting a frequency F1 to the control office that is selectively modulated by vehicle identity tones generated by tone generators 101, 102, 103 and 104 respectively. The carrier frequency F1 is also modulated by tones indicative of the several location ponits, these tone generators being identified as tone generators 11 through 21 inclusive.

The transmitter on each vehicle for transmitting the frequency F1 has associated therewith a Monitor Receiver and an associated monitor controlled relay MOR for permitting transmission only when no other vehicle is transmitting by use of its associated transmitting apparatus.

A vehicle identity selector switch TIS is provided on each vehicle for selecting a tone characteristic of the identity of that vehicle to be transmitted by modulation of the frequency F1. Suitable keying relays K1 and K2 (see FIG. 3C) are provided on each vehicle for keying the transmission of a pulse to the control office each time the vehicle passes a location point.

Figure 3E:
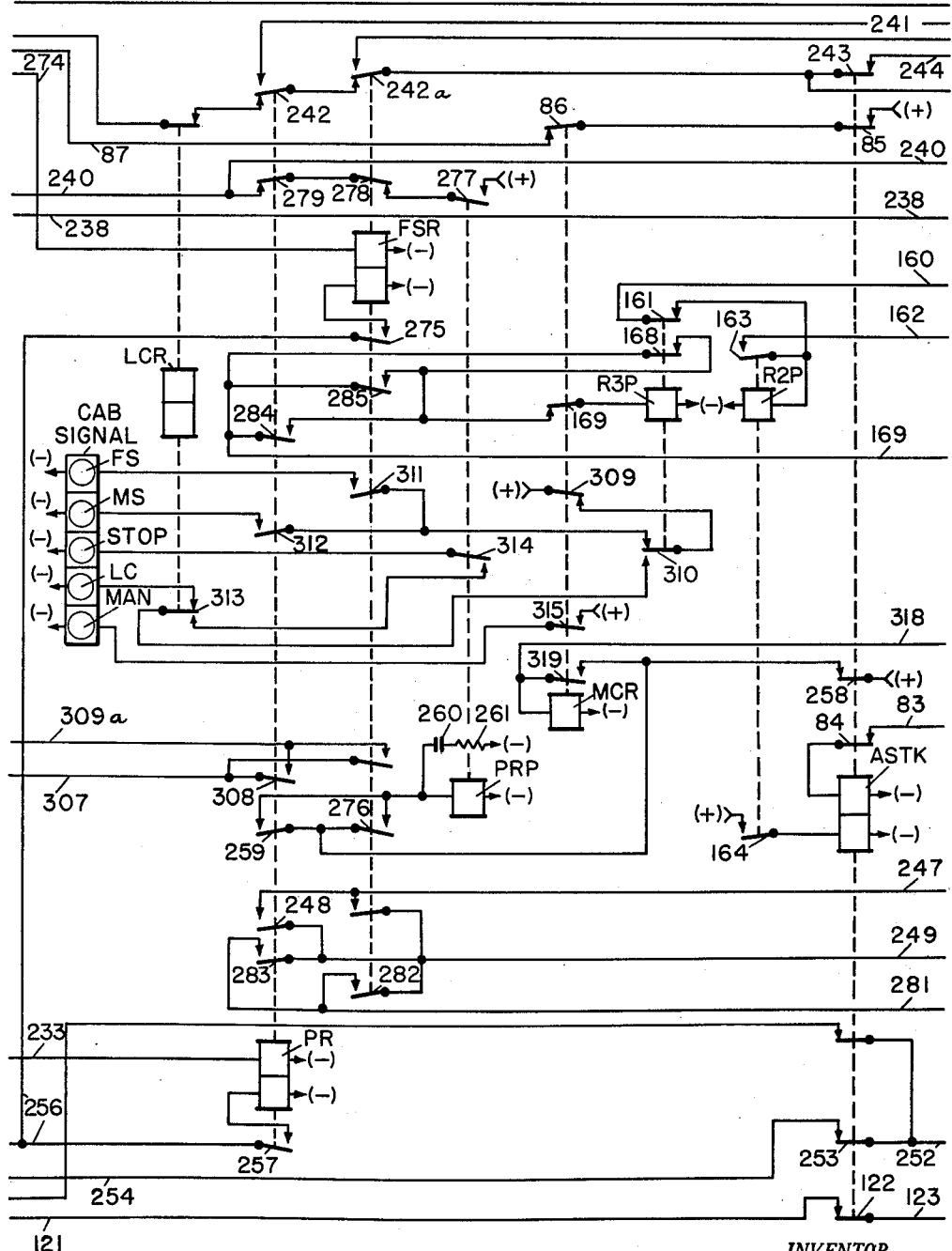
Figure 3G:
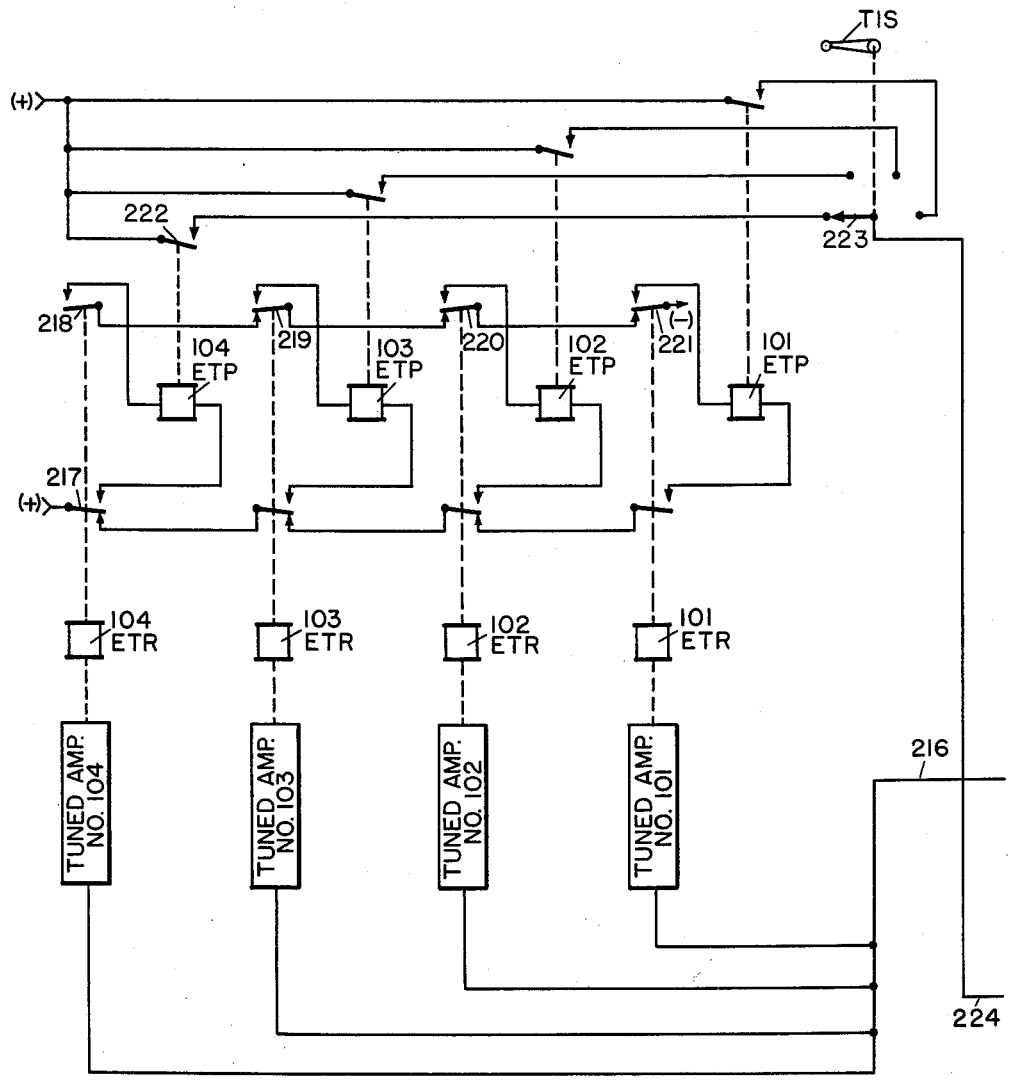
Figure 3H:
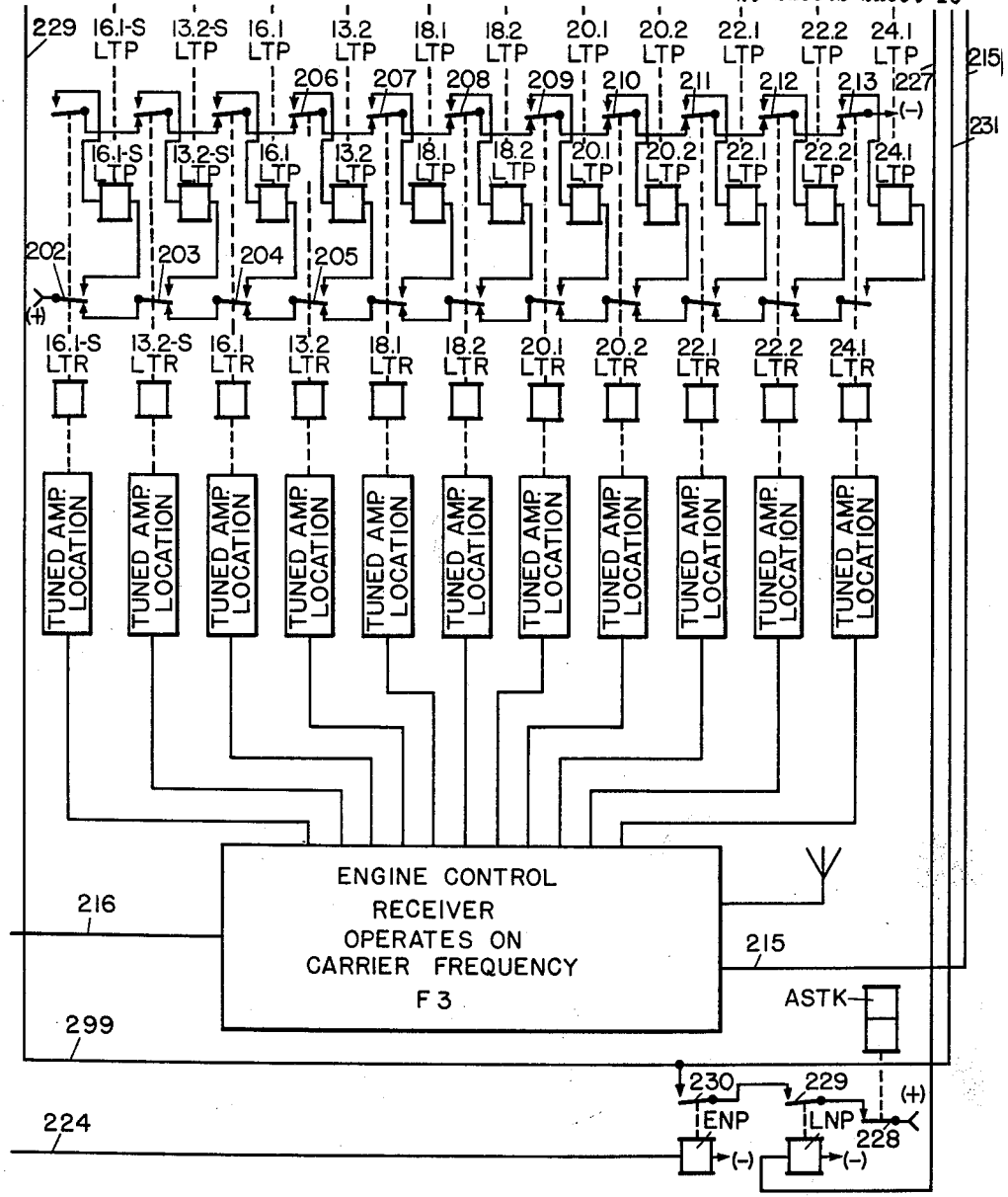

Each of the vehicles also carries a vehicle receiver as is shown in FIG. 3H for receiving selectively modulated pulses of a carrier frequency F3 communicated from the control offices.

Associated with this receiver are location relays 16.1–S LTR, 13.2,S LTR, 16.1. LTR, 13.2 LTR, 18.1 LTR, 18.2 LTR, 20.1 LTR, 20.2 LTR, 22.1 LTR, 22.2 LTR, and 24.1 LTR. Repeater relays LTP are provided for the several relays LTR.

Train identity receiver relays 101 ETR, 102 ETR, 103 ETR and 104 ETR are provided on each vehicle for registration of a vehicle identity corresponding to that which has been communicated to the control office as a check that the controls received from the control office are for the particular vehicle that has just previously transmitted an interrogation pulse asking for the transmission of controls upon having reached a particular location point.

Relays ENP and LNP (see FIG. 3H) are provided on each vehicle for registration that the identity of the vehicle and the location received from the control office corresponds with similar identities that have been transmitted to the control office, and these relays in combination with a stop control check relay ASTK are provided for permitting execution of control tones selectively transmitted along with the identities for governing operation of the vehicle.

Thus the receiving apparatus on each vehicle for use in communicating with the control office also includes a control relay PSTR (see FIG. 3D) for actuation upon reception of a proceed signal tone, a local control relay LCTR for reception of a local control tone, a full speed relay FSTR for the reception of a full speed tone, a backward running relay BRTR for the reception of a backward running tone, a forward running relay FRTR for the reception of a forward running tone and a stop control relay RSTR for the reception of a stop control tone. Repeater relays (see FIG. 4) PR, LCR, FSR, BDR, FDR, and RSR are associated with the several relays mentioned above which are responsive to control tones communicated from the control office.

With reference to FIG. 4, vehicle carried apparatus includes a servo mechanism for throttle control of the locomotive in accordance with a plurality of different speed controls selectively applied to the servo apparatus, and a suitable forward and reverse controller is included on the vehicle for controlling the forward and reverse operation of the vehicle in accordance with selected forward and reverse control circuits provided for operation of the controller.

With reference to FIG. 4 further radio communication apparatus is provided on each vehicle in the form of a radio receiver responsive to distinctive frequencies which may be selectively communicated from the transmitters of several local operators. Thus the radio receiver illustrated in FIG. 4 is shown as being selectively tuned to receive frequencies F4, F5 and F6 in accordance with the particular zone in which the vehicle may be operated. This radio receiver has tone receiving apparatus for control of a forward relay FWC and a backward relay BWC which are selectively energized to control the direction of movement of the associated vehicle. The vehicle will continue to move at low speed as long as FWC or BWC is held energized by the local operator.

As the control office, a radio receiver is illustrated in FIG. 5A as being provided for receiving the tones transmitted from the respective vehicles on the frequency F1 indicative of vehicle and location identities. The location identity tones are received by the several tuned amplifiers FLM provided for the several zones. Relays CIF are provided for the several zones and are energized by the output of the respective tuned amplifiers FLM.

A relay CIR is provided for each of the relays CIF, for each vehicle, subject to energization upon the reception of pulses from the respective vehicles upon passage of the several location points.

With reference to FIG. 5A, tone amplifiers 101, 102, 103 and 104 are tuned to the identity frequencies for associated vehicles for respective east and westbound traffic. The tuned amplifier 101, for example, is for use in registration of the identity of train No. 1 for westbound traffic, and the tone amplifier 102 is for use in registration of the identity of train No. 2 for eastbound traffic. The outputs of these vehicle identity tone amplifiers are used in the energization of the relay CIR as selected by the zone identity relay CIF.

Relays TRX (see FIGS. 6A, 6B and 6C) are provided at the control office for the respective zones, together with slow drop away associated repeater relays TRXP for the purpose of registering occupancy of the respective zones upon the passage of vehicles. These relays are normally energized, and are deenergized upon occupancy of the associated zones and reenergized only after it has been proven that the vehicle operating within the associated zone has registered entrance into the next zone in advance.

A relay P1 is provided at the control office for each vehicle when in each zone. These relays are normally energized, and they are used in the control of the block occupancy relays TRX.

With reference to FIGS. 7A through 7D, relays D are provided for use in determining the condition of occupancy and reservation for opposing traffic of the right of way in advance of a vehicle, and these relays are used in determining the extent to which a vehicle may be permitted to proceed from zone to zone in accordance with the conditions of traffic.

Figure 7C:
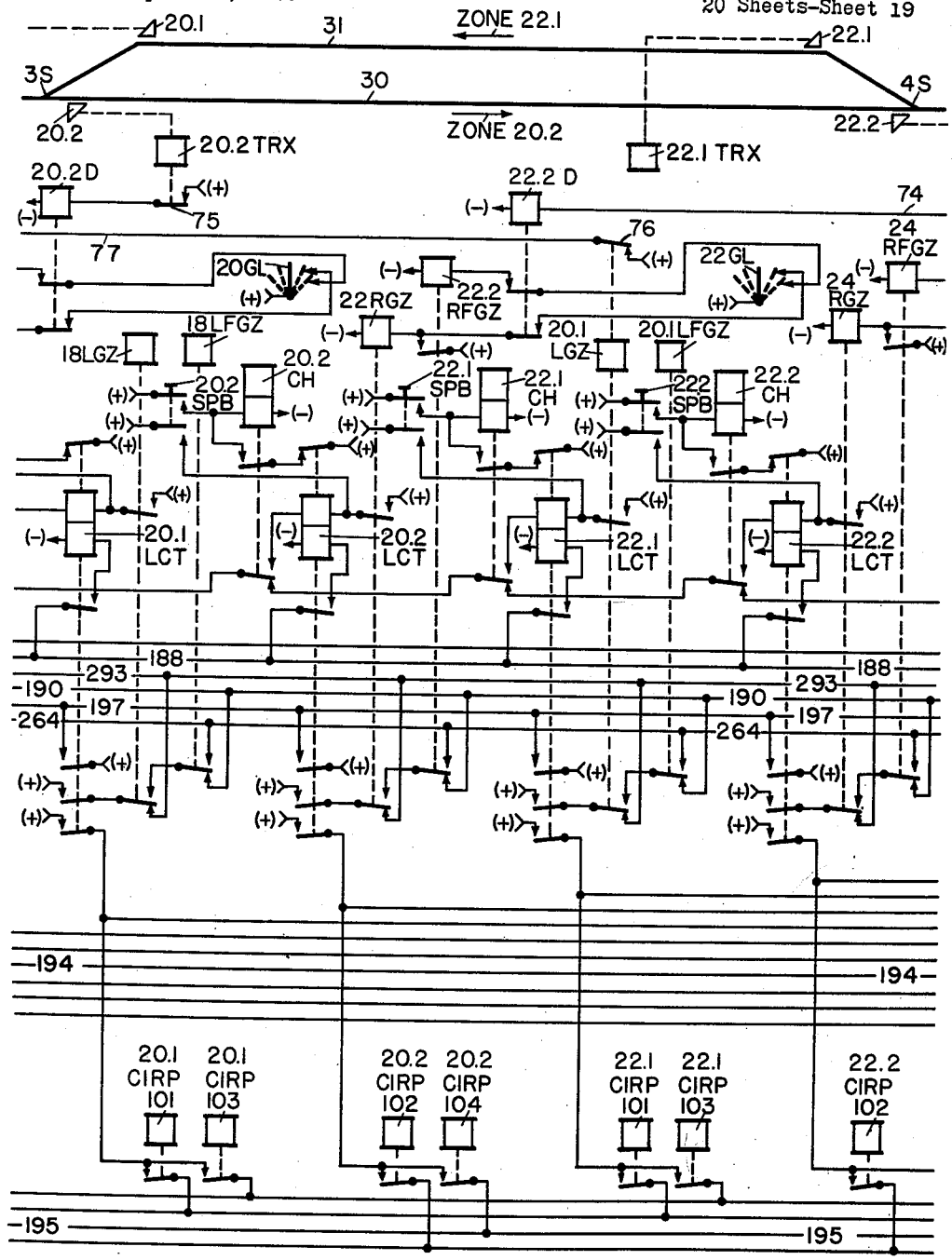
Figure 7D:
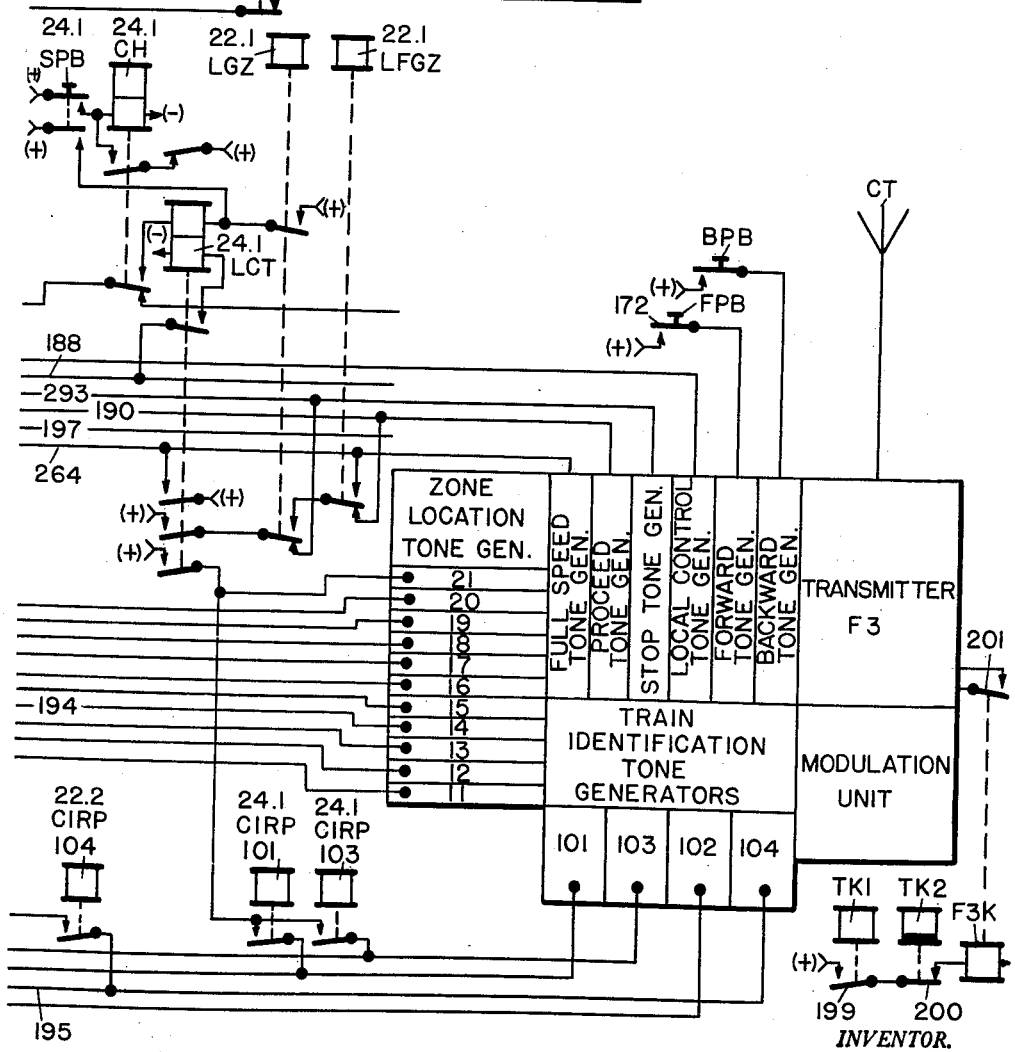

A control office-to-vehicle radio transmitter, transmitting on a frequency F3, is illustrated in FIG. 7D as being provided for the communication of identity tones to the respective vehicles to call such vehicles and to confirm that their identities have been registered in proper zones at the control office. This transmitter is also effective to transmit tones to the respective vehicles for controlling the vehicles in accordance with controls that have been predetermined at the control office.

Because it is assumed that the operator at the control office is to have supervisory control over the passage of the vehicles, it is provided that the operator must designate that he wishes passage of a vehicle from zone to zone, and this he does by actuation of suitable manual control levers governing the energization of suitable relays RGZ for the respective zones. It is further provided that the operator may designate full speed operation through the respective zones by actuation of his control levers to distinctive full speed control positions, and in accordance therewith, relays RFGZ are selectively governed to select proper tones for communication to the vehicles in accordance with such designation. Push buttons FPB and BPB (see FIG. 7D) are provided at the control office for designation of forward and backward running controls respectively for communication to the respective vehicles.

Apparatus is provided at the control office for initiation of the transmission of modulated control pulses to the respective vehicles in the respective zones, and this apparatus includes a change relay CH for each of the zones, a code selecting relay LCT for each of the zones and a relay LCS is provided for permitting transmission to only one train at one time.

Relays TK1 and KT2 (see FIG. 7A) are provided at the control office for the keying of the transmission of modulated control pulses to the several vehicles.

Having thus described the organization of the apparatus provided for one embodiment of the present invention, further consideration of the circuit organization will be considered with reference to the description of the mode of operation of the apparatus under typical operating conditions.

OPERATION

General

Before considering the mode of operation with reference to the specific circuit organization, consideration will be given to the general mode of operation as is illustrated by the block diagram of FIG. 2.

Normally the system is at rest, and communication takes place only when a vehicle passes a location point upon entering a new zone. At this time, the vehicle first has communicated thereto a control for initiating application of the brakes by reason of the vehicle carried coils PC being inductively coupled with annunciator coils A and C at a location point (see FIG. 1). These coils together with Vehicle Wayside Communication Apparatus 37 (see FIG. 2) provides for actuation of Annunciator Brake Initiating Apparatus 38.

Upon further passage of the vehicle, the coils PC carried by the vehicle couple inductively with wayside identity coils and the Vehicle Wayside Communication Apparatus 37 is effective to provide an output control to the Location Identity Registration apparatus 39 to register on the vehicle the identity of the particular zone about to be entered.

Upon further progress of the vehicle, the receiver REC couples inductively with a wayside train control inductor for actuating Inductive Receiver Brake Initiating Apparatus 40 on the vehicle to initiate application of the brakes of the vehicle via communication apparatus separate from the communication apparatus which has been considered for actuation of the Annunciator Brake Initiating Apparatus 38. The reception of the second stop control provides an energizing circuit for picking up a relay ASTK (see FIG. 3E) which has been deenergized by the reception of an annunciator brake control as registered by apparatus 38. Thus the check of the operation of the system wherein both stop controls are communicated is that the relay ASTK is dropped upon reception of the first control on the vehicle and is restored to a normal picked up position upon reception of the stop control communicated via the inductive train control system. It will thus be seen that the failure of the relay ASTK to be actuated through this normal cycle is detected on the vehicle as a check of the integrity of the automatic brake application system to immediately detect the failure of the inductive brake application communication apparatus. Failure of the relay ASTK to be properly actuated prevents the execution on the vehicle of a proceed control, and thus requires that the brakes of the vehicle be applied after the time has expired provided by Brake Time Delay Apparatus 41.

In accordance with Location Identity Registration on a vehicle as has been provided, and as is indicated by the block 39 of the block diagram of FIG. 2, Vehicle Control Office Communication Apparatus 42 is set into operation for communicating a pulse at the frequency F1 to the control office. Such pulse is modulated in accordance with the identity of the location point just passed and in accordance with the identity of the particular vehicle, and the reception at the control office by Control Office-Vehicles Communication Apparatus 43 registers the presence of the vehicle in the new zone and checks the vehicle out of the zone it is leaving. Thus occupancy is registered by Zone Occupancy Registration Apparatus 44 which in turn acts upon an interlocking circuit organization 45 to prevent conflicts in the communication of proceed controls to other vehicles. In accordance with the reception and proper registration of the check-in and check-out controls at the control office, the control office transmitter is initiated into the transmission of a reply pulse at the frequency F3 that is modulated in accordance with Vehicle Control Selections 46 which have been preselected by the operation of selection levers by an operator.

The reception on a vehicle of the modulations applied to the frequency F3 by the apparatus 42 provides control energy to forestall the application of the brakes by acting upon the Braking Time Delay Apparatus 41 before its time has run out, and the reception of a proceed control, for example, acts upon Vehicle Operating Apparatus 47 to control the operating mechanism of the vehicle to cause it to proceed through the zone it has entered at a predetermined speed.

If the system is used as has been described for the operation of ore trains for example, when an empty train passes the last location point under control of a operator at the control office and enters a zone of mining operations, a control tone is communicated to the vehicle to condition Vehicle-Local Operator Communication Apparatus 48 so that the control of the vehicle is subject to radio communication via carrier frequency F4 or carrier frequency F5, dependent upon the particular operating zone to which the vehicle has been sent by remote control from the operator at the control office. If the vehicle has been sent to a zone subject to control by local operator No. 1, the transmitting apparatus 49 is effective to communicate controls for remotely operating the vehicle via carrier frequency F4, and similarly if the vehicle has been remotely operated to a zone under control of local operator No. 2, the Local Operator No. 2 Vehicle Communication Apparatus 50 is effective via carrier frequency F5 to communicate controls for the remote operation of the vehicle.

Normal Conditions

For the purpose of considering the mode of operation of the system, it is assumed that the normal conditions of the apparatus are the conditions which are illustrated in the drawings wherein the right of way is assumed to be unoccupied by a vehicle except for the presence of a vehicle on the loading track 32 as is illustrated in FIG. 7A. Under these conditions, all of the zone occupancy registration relays TRX and their repeater relays TRXP are in their energized positions, because the work tracks 32 and 33 are beyond the control of the control office operator. Relays P1, associated with the control of relays TRX, are also normally energized. With reference to FIG. 6A the relay 13.2 P1 102, for example, is normally maintained energized by a stick circuit extending from (+), including back contact 60 of relay 13.2 CIR 102, front contact 61 of relay 13.2 P1 102, and winding of relay 13.2 P1 102, to (—). The relay 13.2 P1 104 is also normally maintained energized by a similar stick circuit closed at back contact 62 of relay 13.2 CIR 104. In accordance with the energization of these relays, relay 13.2 TRX for the zone 13.2 is normally maintained energized by a circuit extending from (+), including front contact 63 of relay 13.2 P1 104, normally closed contact 64 of push button 13.2 CPB, normally closed contact 65 of push button 13.2 CPB, front contact 66 of relay 13.2 P1 102, and winding of relay 13.2 TRX, to (—). In accordance with the energized condition of relay 13.2 TRX, the repeater relay 13.2 TRXP is normally maintained energized by an obvious circuit closed at front contact 67 of relay 13.2 TRX. In a similar manner the relays TRX for registering occupancy of the other zones are maintained energized when their associated zones are unoccupied by a vehicle.

The relays illustrated in FIGS. 7A through 7D for use in initiating communication of control pulses to vehicles are normally deenergized. Relays D are provided for registering the condition of occupancy of the right of way in advance of a train. The pick-up circuit for each D relay extends through front contacts of the relevant occupancy relays TRX and back contacts on GZ relays for opposing controls. For the purpose of simplifying the disclosures of this embodiment of the present invention, the control circuits for the relays D have been illustrated only for the relays D provided for the control of eastbound vehicles, but it is to be understood that a similar circuit organization is provided for the control of relays D (not shown) for association with the control of westbound vehicles.

With reference to FIG. 7D, the relay 24.2 D is energized by a circuit extending from (+), including back contact 68 of relay 26 LGZ, front contact 69 of relay 26.1 TRX, front contact 70 of relay 24.2 TRX, and winding of relay 24.2 D, to (—). Thus, the relay 24.2 D checks that the section of right of way immediately beyond the marker 24.2 is unoccupied and there is no control designated for entrance of a westbound vehicle into that section. The relay 26 LGZ would be picked up if a control had been designated by an operator for the passage of a westbound train into the section extending east of the marker 24.2. Similarly the relay 22.2 D is normally energized by a circuit including back contact 68 of relay 26 LGZ, front contact 69 of relay 26.1 TRX, back contact 71 of relay 24 LGZ, front contact 72 of relay 24.1 TRX, front contact 73 of relay 22.2 TRX, and wire 74. With reference to FIG. 7C, the relay 20.2 D is maintained energized in accordance with the closure of front contact 75 of relay 20.2 TRX. With reference to FIG. 7B, the relay 18.2 D is normally energized by a circuit including back contact 76 of relay 20.1 LGZ, wire 77, front contact 78 of relay 20.1 TRX, and front contact 79 of relay 18.2 TRX.

With reference to FIG. 7A, the relay TK2, which is used in keying the transmission of control pulses is normally energized in accordance with the closure of back contact 80 of relay TK1.

To consider normal conditions of the vehicle carried equipment, it will be assumed that the vehicle having its apparatus illustrated is at stop as would be the case if the vehicle were being loaded at a mining location. It is to be understood that the Servo-Control and Regulator for Operating the Vehicle at Selected Speed (see FIG. 4), is effective to apply the brakes to the vehicle to bring it to stop whenever there is no energy applied to the mechanism for a proceed operation, either in response to control by an operator at the centralized traffic control office, or by the operator at a local point of mining operations. As will be more readily apparent as the description progresses, the relays FWC and BWC of FIG. 4 for governing forward and backward movement of the vehicle in response to controls communicated by a local operator are subject to energization only when an operator holds one of his control buttons FC or BC (see FIG. 8) in its depressed position. Thus for the conditions considered as normal, it is assumed that no forward or backward control is being designated by a local operator, and thus that the vehicle is maintained in a position in which it has been spotted for loading as a part of a mining operation, with its brakes being applied by the servo-control mechanism.

With reference to FIG. 3F, the relays R1, R2 and R3 which are associated with the intermittent inductive train control apparatus are in their normally energized positions because of energization of circuits well-known to those skilled in the art. It is thus considered unnecessary to consider in detail the circuit organization for the control of these relays.

The annunciator stick relay ASTK (see FIG. 3E) is maintained normally energized by a stick circuit extending from (+) including back contact 81 of relay ANR (see FIG. 3F) normally closed contact 82 of relay R2, wire 83, front contact 84 of relay ASTK and winding of relay ASTK, to (—).

With relay ASTK in its picked up position, a stick circuit is closed to maintain the local control relay LCR on the vehicle energized. This relay must be assumed to have been picked up by the communication of a control from the control office to turn over control of the vehicle to the local operator at the mining location for spotting. The stick circuit by which relay LCR is maintained energized extends from (+) including front contact 85 of relay ASTK, back contact 86 of relay MCR, wire 87, front contact 88 of relay LCR and lower winding of relay LCR (—).

*Remote Control of Vehicle by Local Operator*

Assuming that an ore train is occupying the work track 32 as has been described, and that the local operator wishes to operate the train so as to leave the work track 32 and pass the marker 13.2 This is so that the train can be put under the control of the operator at the centralized traffic control office.

With reference to FIG. 8, the local operator actuates the manual channel tone selector switch MCTS to a position in correspondence with the carrier frequency that has been assigned for use in controlling trains in the work track 32. If this is assumed to be the frequency F4, the selector switch MCTS is placed in the position in which it is illustrated, and the switch SW1 is closed to apply power to the communication apparatus. Energy is applied through this switch and through contact 89 of switch MCTS to energize relay F4. The energization of this relay is effective through its contact 90 to tune the radio transmitter illustrated in FIG. 8 to the frequency F4, this being the frequency for communication with the train assumed to be occupying the work track 32. If the local operator wishes to operate the train V (see FIG. 7A) in a forward direction, he depresses the push button FC, and the actuation of this button energizes a transmit relay TRM, which in turn renders the transmission of the carrier for the selected frequency effective upon the closing of front contact 91. Relay TRM is energized by a circuit including switch SW1, normally closed contact 92 of backward push button BC and contact 93 of button FC in its depressed position.

At the same time, the tone generator illustrated in FIG. 8 for tone No. 2 is rendered effective to modulate the carrier in accordance with the energization of a circuit applied to this tone generator including switch SW1, normally closed contact 94 of button BC, contact 95 of button FC in its depressed position, and contact 96 of channel and tone selector switch MCTS.

With reference to FIG. 4, the reception on the train of this tone is effective to energize the relay FWC. The radio receiver illustrated in FIG. 4 is tuned to the frequency F4 at this time by reason of energization of the relay LF4, this relay being energized because of a zone relay 16.1 LT begin in its picked up position. The relay 16.1 LT must be assumed to have been picked up upon entrance of the train into the work track 32. Thus the relay LF4 is picked up because of the closure of front contact 97 of relay 16.1 LT, and the picking up of relay LF4 renders the tuning of the radio receiver to the frequency F4 effective in accordance with the closure of front contact 98.

The forward control relay FWC on the train is picked up upon the reception of the tone T2 by the energization of a circuit including front contact 99 of relay 16.1 LT and front contact 100 of the local control relay LCR. It will be noted that the local control relay LCR can also selectively govern the energization of the radio receiver for receiving from a local operator in accordance with the closure of front contact 101.

A low speed control is selected, and the Servo-Control and Regulator is energized accordingly, by the application of energy to the low speed terminal L through front contact 102 of relay ASTK, back contact 103 of relay PR, back contact 104 of relay FSR, front contact 105 of relay LCR, back contact 106 of relay BWC, front contact 107 of relay FWC, contact $f$ of the Forward and Reverse Controller, and contact $l$ of the Vehicle Speed Contactor SG, indicating that the controller is conditioned for forward movement of the train. It will be noted that the application of energy to terminal L also applies energy to the valve EPV to permit release of the brakes of the train in accordance with energization of the Servo-Control and Regulator.

The Forward and Reverse Controller of FIG. 4 is actuated to its forward controlling position, if it is not already in this position, by the energization of relay FDR. The circuit by which relay FDR is energized (see FIG. 3D) includes back contact 108 of relay BWC, front contact 109 of relay FWC and front contact 110 of relay LCR. This relay when picked up is maintained energized by a stick circuit including front contact 111 of the forward-backward repeater relay F-BRP, front contact 112 of relay FDR and back contact 113 of relay BDR. With reference to FIG. 4, the Forward and Reverse Controller 114 is actuated to provide a forward control for the train in accordance with energy applied to the Forward Control wire through front contact 115 of relay ASTK, back contact 116 of relay MCR, back contact 117 of relay BDR, and front contact 118 of relay FDR.

The train V (see FIG. 7A), when thus initiated, is operated at the selected low speed in an easterly direction as long as the local operator maintains his forward control button actuated to a depressed position. When the train reaches the marker 13.2, however, its control by the local operator is terminated by the dropping away of the train carried relay LCR. The relay LCR is dropped away in accordance with the train V being checked into the zone 13.2.

The mode of operation under these conditions is that the receiving apparatus of FIG. 3A is responsive to the wayside annunciator coils tuned to frequencies A and C, and thus the relays A and C of FIG. 3A and their associated repeater relays become energized on the train. This provides an energizing circuit for the annunciator relay ANR (see FIG. 3F) extending from (+), including front contact 119 (see FIG. 3A) of relay CP, front contact 120 of relay AP, wire 121, front contact 122 of relay ASTK, wire 123 and winding of relay ANR, to (−) Annunciator relay ANR is made slow to drop away by having its winding shunted by a suitable capacitor 124 in series with a resistor 125. The picking up of relay ANR causes the dropping away of the annunciator stick relay ASTK (see FIG. 3E) by the opening of back contact 81 (see FIG. 3F). The dropping away of relay ASTK causes the dropping away of the local control relay LCR by the opening of the stick circuit for this relay at front contact 85 (see FIG. 3E).

With reference to FIG. 4, the dropping away of the local control relay LCR deenergizes the radio receiver for communication with the local operator by the opening of front contact 101, and causes the dropping away of the forward control relay FWC by opening its control circuit at front contact 100. The dropping away of relay FWC in turn removes energy from the low speed control terminal L of the Servo-Control and Regulator by the opening of front contact 107. Thus because of the Servo-Control and Regulator having no energy applied thereto, the train brakes are applied, and the train will be brought to a stop.

It is understood that relay LCR may be made somewhat slow release so as to provide a suitable delay time e.g. 5 seconds during which the local operator continues to hold the relay FWC in the picked-up position while the check-in pulse is transmitted to the C.O. and the prepared proceed control is automatically sent to the train. In this way the train can be transferred from the control of the local operator to the dispatcher at the C.O. without stopping the train.

*Remote Control of Vehicle by CTC*

To consider the mode of operation for governing the operation of a vehicle remotely by centralized traffic control from the control office, it will be assumed that a loaded ore train has been moved past the marker 13.2 (see FIG. 7A) by a local operator as has been described, and thus the train is brought to a stop beyond this marker.

In accordance with the train having passed the marker 13.2, a pulse has been transmitted to the control office identifying the marker and the train for registration of occupancy of the train in the zone 13.2. This transmission is in accordance with the registration of the identity of the marker on the train by the energization of the relay 13.2 LT (see FIG. 3B). The circuit for energization of this relay includes back contact 126 of relay FP (see FIG. 3A), front contact 127 of relay EP front contact 128 of relay DP, back contact 129, 130 and 131 of relays CP, BP and AP respectively and wire 132. The picking up of relay 13.2 LT opens a normally energized circuit for the keying relay K1 (see FIG. 3C). The circuit by which relay K1 is normally energized includes back contacts 133 (see FIG. 3B), 134, 135, 136, 137, 138, 139, 140, 141, 142 and 143 of relays 16.1–S LT, 13.2–S LT, 16.1 LT, 13.2 LT, 18.1 LT, 18.2 LT, 20.1 LT, 20.2 LT, 22.1 LT, 22.2 LT and 24.1 LT respectively and wire 144. In accordance with relay K1 being in its picked up position, its slow drop away repeater relay K2 is also in its picked up position because of its circuit being closed at front contact 145.

The dropping away of the relay K1 prior to the dropping away of relay K2 renders the transmitter on the train effective to transmit a pulse at carrier frequency F1 in accordance with the energization of a suitable transmitter relay T through back contact 146 of relay K1 and front contact 147 of relay K2. Energy is also applied through these contacts to a selected tone generator indicative of the identity of the train for modulation of a carrier with that particular tone, and the tone generator 14 is rendered effective to modulate the carrier in accordance with the identity of the location point 13.2 which has been passed, and in accordance with the identity of this point having been registered by the picking up of the relay 13.2 LT of FIG. 3B. The circuit by which energy is applied to the tone generator No. 14 includes back contacts 133 (see FIG. 3B), 134 and 135 of relays 16.1–S LT, 13.2–S LT and 16.1 LT respectively, front contact 136 of relay 13.2 LT and wire 148.

The reception at the control office of the pulse of the carrier frequency F1, modulated as has been described, causes the picking up of relay 13.2 CIF at the control office (see FIG. 5A) for registration of the identity of the location point that has just been passed, and the relay 13.2 CIR in turn becomes picked up in accordance with the reception of the identity of the particular train as train No. 104 having entered zone 13.2. The circuit for the energization of relay 13.2 CIR is energized by the output of tone receiver amplifier 104 through back contact 149 of relay 13.2–S CIF and through front contact 150 of relay 13.2 CIF.

With reference to FIG. 6A, the picking up of relay 13.2 CIR 104 opens a circuit at back contact 62 that has been described for maintaining relay 13.2 P1 104 in its picked up position. The closure of front contact 62 of relay 13.2 CIR 104 provides for the picking up of the repeater relay 13.2 CIRP 104, and this relay when picked up is maintained energized by a stick circuit including back contact 151 of relay 13.2 P1 104 and front contact 152 of relay 13.2 CIRP 104. Upon the dropping away of relay 13.2 P1 104 the zone occupancy relay 13.2 TRX becomes deenergized upon the opening of front contact 63.

If it is assumed that the operator at the control office has not designated a proceed control prior to the movement of the train by a loacl operator into the zone 13.2 the passage of the train over the wayside inductor actuates the receiver on the train so as to cause application of the brakes. This is accomplished according to the normal mode of operation of intermittent conductive train control apparatus that is well-known to those familiar with the art wherein the relays R1, R2 and R3 become successively dropped away (see FIG. 3F). The dropping away of relay R2, with the annunciator ANR in its picked up position is effective to cause the picking up of relay R2P by the energization of a circuit including front contact 158 of relay ANR (see FIG. 3F), contact 159 of relay R2 in its deenergized position, wire 160 and front contact 161 of relay R3P. Relay R2P when thus picked up is maintained energized by a stick circuit including front contact 158 of relay ANR, wire 162 and front contact 163 of relay R2P. Relay R2P, upon picking up, closes a pick up circuit for relay ASTK at front contact 164. Relay ASTK will be maintained picked up after the dropping away of relay ANR by the energization of a circuit including back contact 81 of relay ANR, back contact 165 of relay R3, back contact 82 of relay R2, wire 83 and front contact 84 of relay ASTK. Relay R3P (see FIG. 3E) is dropped away upon the dropping away of relay R3. The circuit by which relay R3P has been maintained energized includes front contact 166 of relay R3, wire 167, front contact 168 of relay R3P and back contact 169 of relay MCR.

It will be noted that the brake control valve EPV, which has been energized to permit passage of the train in the work track area, has become deenergized upon the removal of energy applied to the Servo-Control and Regulator apparatus, and thus the valve EPV becomes actuated, but it is to be understood that the brakes of the train are applied immediately irrespective of the deenergization of this valve in accordance with the deenergization of the Servo-Control and Regulator apparatus.

Assuming now that the operator at the CTC control office wishes to transmit a control for starting operation of the train, he actuates the lever 18 GL (see FIG. 7B) to its right-hand proceed position to provide for the energization of relay 18.2 RGZ. This relay is energized through contact 153 of relay 18.2 D. Because of the relay 13.2 CIR 104 having been picked up, the capacitor 154 has been charged through front contact 155 of relay 13.2 CIR 104 and through back contact 156 of relay 13.2 CIR 102. The relay 13.2 CIR 104 is maintained energized only for the duration of the pulse of carrier frequency F1 received from the train, and thus this relay becomes dropped away at the end of the pulse. The capacitor 154, therefore is charged, and the picking up of relay 18.2 RGZ as has been described closes a circuit for the discharge of the capacitor 154 through the upper winding of relay 13.2 CH to cause that relay to become picked up. This circuit includes back contact 156 of relay 13.2 CIR 102, back contact 155 of relay 13.2 CIR 104, back contact 170 of relay 13.2 TRX and front contact 171 of relay 18.2 RGZ.

Inasmuch as it is assumed that the train has been stopped, it is necessary that the operator at the control office also designated a forward or a backward control for transmission, and in this case it is assumed that a forward control is designated. This is accomplished by the operator holding the push button 172 (see FIG. 7D), in its depressed position during transmission to cause the transmission of a forward control tone in addition to a proceed tone and other tones that are automatically selected for transmission indicative of the train and location identity.

With reference to FIG. 7B, the picking up of relay 13.2 CH by the discharge of a capacitor through its upper winding as has been described closes a stick circuit for maintaining relay 13.2 CH picked up until transmission is rendered effective of the controls that have been designated. The stick circuit for relay 13.2 CH includes back contact 173 of relay 13.2 LCT and front contact 174 of relay 13.2 CH.

In accordance with the picking up of relay 13.2 CH, relay 13.2 LCT is picked up for selection of the tones for modulation of a pulse to be transmitted at the carrier frequency F3. The pickup circuit for relay 13.2 LCT includes front contact 175 of relay 18.1 TRX, front contact 176 of relay 18.2 RGZ, upper winding of relay 13.2 LCT, front contact 177 of relay 2WK (indicative of the track switch 2W being in its normal position), front contact 178 of relay 13.2 CH, wire 179, back contacts 180, 181, 182, 183 and 184 of relays 13.2–S CH, 16.1 CH, 16.1–S CH, LCS and TK1 respectively and front contact 185 of relay TK2. Upon the picking up of relay 13.2 LCT, relay LCS becomes picked up in a stick circuit for relay 13.2 LCT including front contact 186 of relay TK2 connected in multiple with back contact 187 of relay TK1, winding of relay LCS, wire 188, front contact 189 of relay 13.2 LCT and lower winding of relay 13.2 LCT.

The picking up of relay 13.2 LCT selects a proceed tone for transmission by application of energy to the proceed bus 190 through front contact 191 of relay 13.2 LCT, front contact 192 of relay 18.2 RGZ and back contact 265 of relay 18.2 RFGZ. The closure of front contact 193 of relay 13.2 LCT applies energy through wire 194 to tone generator No. 14 to render effective the modulation of a carrier pulse for transmission to the train at a tone characteristic of the identity of the location point that has been registered at the control office in accordance with reception of such identity from the train. The closure of front contact 193 of relay 13.2 LCT also provides for the modulation of the pulse of carrier at frequency F3 with a tone indicative of the identity of train No. 104 as having checked into the zone 13.2. This is accomplished by energy applied to bus wire 195 through front contact 193 of relay 13.2 LCT and front contact 196 of relay 13.2 CIRP.

The keying of the pulse of carrier frequency F3 is accomplished by the picking up of relay TK1, this relay being picked up by the energization of the bus wire 197 through front contact 198 of relay 13.2 LCT. The picking up of relay TK1 is effective to energize the keying relay F3K (see FIG. 7D) by energization of a circuit including front contact 199 of relay TK1 and front contact 200 of relay TK2. The closure of front contact 201 of relay F3K renders the transmission of the pulse effective. Relay TK2 (see FIG. 7A) is slow to drop away upon the opening of its circuit at back contact 80 of relay TK1, and thus the drop away time of the relay TK2 times the pulse transmitted to the train.

The pulse is received on the train by the receiving apparatus illustrated in FIG. 3H, and in accordance with the reception of the tone No. 14 indicative of the address of the vehicle, the relay 13.2 LTR becomes picked up. The picking up of relay 13.2 LTR establishes a pick-up circuit for its repeater relay 13.2 LTP to cause that relay to become picked up. The circuit for the energization of relay 13.2 LTP includes back contact 202 of relay 16.1–S LTR, back contact 203 of relay 13.2–S LTR, back contact 204 of relay 16.1 LTR, front contact 205 of relay 13.2 LTR, winding of relay 13.2 LTP, front contact 206 of relay 13.2 LTP and back contacts 207, 208, 209, 210, 211, 212 and 213 of relays 18.1 LTR, 18.2 LTR, 20.1 LTR, 20.2 LTR, 22.1 LTR, 22.2 LTR and 4.1 LTR respectively.

Because of the carrier pulse received being modulated with a proceed control tone, energy is also applied to the proceed signal tone amplifier 214 of FIG. 3D as is indicated by this amplifier being connected by reference line 215 to the Carrier Frequency F3 Receiver. This causes the picking up of relay PSTR (see FIG. 3D) for the duration of the pulse, and in accordance with the picking up of this relay, the proceed control relay PR (see FIG. 3E) is picked up on the vehicle, this relay having stick circuit means to maintain it energized as the train proceeds through the zone 13.2. Relay PR is picked up, however, only provided that the train is properly identified as the train having entered the zone 13.2. Thus before the relay PR can be picked up, the train 104 must be identified by the reception of a tone indicative of that train number in accordance with transmission as has been described. This tone causes the picking up for the duration of the received pulse of the relay 104 ETR (see FIG. 3G) in accordance with energization by the Frequency F3 Receiver as is indicated by reference line 216 extending to the tuned amplifier 104. The picking up of relay 104 ETR causes the picking up of its associated repeater relay 104 ETP by energization of a circuit including front contact 217 of relay 104 ETR, winding of relay 104 ETP, front contact 128 of relay 104 ETR and back contacts 219, 220 and 221 of relays 103 ETR, 102 ETR and 101 ETR respectively. A check is made that the train identity number received corresponds with the number assigned to the train and preselected by the manually operable switch TIS (see FIGS. 3G and 3C) by the energization of a circuit for the relay ENP (see FIG. 3H). The circuit for the energization of relay ENP includes front contact 222 of relay 104 ETP, contact 223 of lever TIS and wire 224.

Similarly relay LNP (see FIG. 3H) is picked up to indicate that the zone corresponding to the zone identity tone received from the control office corresponds to the zone identity last registered on the train. Thus the relay LNP becomes picked up upon reception of a pulse from the control office for the vehicle being called in accordance with energization of a circuit including back contact 133 of relay 16.1–S LT (see FIG. 3B) back contact 134 of relay 13.2–S LT, back contact 135 of relay 16.1 LT, front contact 225 of relay 13.2 LT, front contact 226 of relay 13.2 LTP, bus wire 227 and winding of relay LNP. Relay ASTK is in its picked up position at this time as a result of a mode of operation that has been described, and thus energy is applied in accordance with the joint energization of the relays ENP, LNP and ASTK to a control circuit for the energization of relay PR (see FIG. 3E). This circuit includes front contact 228 of relay ASTK (see FIG. 3H) front contact 229 of relay LNP, front contact 230 of relay ENP, wire 231, front contact 232 of relay PSTR, wire 233 and upper winding of relay PR.

The brakes of the train become released in response to the picking up of relay PR upon energization of the valve EPV (see FIGS. 3F and 4), and the train control relays R1, R2 and R3 of FIG. 3F are restored to their normally energized positions. With reference to FIG. 4, the picking up of relay PR causes application of energy to the terminal M of the Servo-Control and Regulator apparatus, and such energization also causes the picking up of relay MP. The circuit for energization of relay MP includes front contact 102 of relay ASTK, front contact 103 of relay PR, contact m of the vehicle speed contactor SG and winding of relay MP. The valve EPV is energized to release the brakes in accordance with the closure of front contact 234 of relay MP. Front contact 234 is connected in multiple with front contacts 235 and 236 of relays LP and HP so that the brakes will be released whenever energy is applied to any of the three different speed control wires connected to the Servo-Control and Regulator. The valve EPV becomes energized through front contact 237 of relay ANRP (see FIG. 3F). Also in accordance with the application of energy to wire 238, relay R3 becomes picked up by energization of a circuit including wire 238, front contact 239 of relay RSR, wire 240, medium speed contact MSL of the vehicle speed contactor SG, wire 241, front contact 242 of relay PR, back contact 242a of relay FSR, front contact 243 of relay ASTK, wire 244, normally closed contact 245 of the manual control push button MCPB, normally closed contact 246 of reset contactor RPB, winding of relay R3, ballast lamps LL and primary winding P of the train control receiver REC. Relay R2 is picked up by the voltage drop across relay R3. Relay R1 is shunted across relay R3 through a circuit including wire 247, front contact 248 of relay PR and wire 249. Relay R2 is picked up in accordance with closure of front contact 250 of relay R1 in multiple with relay R3, thus completing restoration to normal of the conditions of the intermittent train control apparatus to maintain the brakes of the train in their released positions. It will be readily apparent that should the train fail to receive a proceed control from the control office, these relays could not be restored, and the valve EPV could not be energized to release the brakes of the train.

The relay PR (see FIG. 3E) is maintained in its picked up position by the energization of a stick circuit including front contact 251 of relay R2 (see FIG. 3F), wire 252, front contact 253 of relay ASTK, wire 254, front contact 255 of relay RSR, wire 256, front contact 257 and lower winding of relay PR. Relay PRP becomes picked up in response to the picking up of relay PR by the energization of a circuit including front contact 258 of relay ASTK, front contact 259 of relay PR and winding of relay PRP. The winding of relay PRP is shunted by capacitor 260, which is connected in series with resistor 261, to provide that the relay PRP is slow in dropping away.

It has thus been described how the train has been stopped after having passed beyond the control of the local operator in track 32, and that the train has been remotely controlled to release its brakes and initiate operation by a proceed control communicated from the control office.

Although it has been assumed that the train is permitted to come to a stop after having passed the marker 13.2, it is to be understood that if the trackway is clear so that the train will not have to wait beyond the marker 13.2, the operator at the control office can precondition his apparatus to set up a route for the train immediately upon the train entering the zone 13.2. He does this by actuating his control lever 18 GL (see FIG. 7B) to a proceed position as has been described. This provides for the picking up of relay 18.2 RGZ, and thus it is provided that when the train registers its address at the control office as being at marker 13.2, there is immediately an automatic start of the code communication apparatus to transmit a pulse at carrier frequency F3, modulated as has been described. In fact the mode of operation corresponds to that which has been described except that the relay 13.2 CH (see FIG. 6A) is picked up immediately upon the dropping away of relay 13.2 TRX in accordance with the discharge of the capacitor 154.

The reception on the train of the modulated pulse of carrier F3 is effective to pick up the proceed relay PR by a mode of operation similar to that which has been described, but the slow action provided by the capacitor 124 shunted across the winding of the relay ANR (see FIG. 3F) is such as to prevent the dropping away of the valve EPV to apply the brakes of the vehicle before an energizing circuit has been provided for this valve upon transfer of control from the local operator to the remote control by the CTC operator. The valve EPV is energized as has been described with the local control relay LCR in its picked up position (see FIG. 4). Upon the picking of the relay PR, the valve EPV becomes energized through front contact 234 of relay MP as has been described. Under the present conditions where an automatic proceed control is provided for the vehicle, it is not necessary to communicate a forward control from the control office as the vehicle is already in motion, and the apparatus indicated by the block 114 of FIG. 4 has the characteristic of staying in its last actuated position, and thus is already in a forward control position at the time when transfer of authority for remote control of the train is rendered effective.

*Full Speed Control*

The mode of operation as has been described has been assumed to be that wherein the CTC operator designates a proceed control, which is a control to proceed at medium speed. The sequence of operation has been described wherein the Servo-Control and Regulator mechanism of FIG. 4 on the train is energized to provide a medium speed control in accordance with a proceed tone which is received on the train.

If the CTC operator wishes to cause the train to proceed at full speed, rather than at medium speed, in designating the control to be transmitted to the train he actuates the control lever GL associated with the next location point in advance of the zone the train is to enter to its full speed position. Thus, for the passage of a train within zone 13.2, for example, the operator actuates the lever 18 GL (see FIG. 7B) to a right-hand full speed position (last right-hand position); and in accordance with such actuation, the full speed relay 18.2 RFGZ for eastbound traffic is picked up. The circuit for the energization of this relay includes a contact of lever 18 GL and front contact 262 of relay 18.2 D. The picking up of this relay also causes the picking up of relay 18.2 RGZ in accordance with the closure of front contact 263, and the picking up of relay 18.2 RGZ is effective upon reception of the check-in control from the train to cause the transmission of a pulse at frequency F3 to the train which is modulated with a tone indicative of full speed control. This tone is applied in accordance with the application of energy to the full speed tone bus 264 through front contact 191 of relay 13.2 LCT, front contact 192 of relay 18.2 RGZ and front contact 265 of relay 18.2 RFGZ.

With reference to FIG. 3E, the reception of the full speed tone on the train causes the picking up of the full speed relay FSR after the above described checks have been made to insure that the tone is being received by the proper train. The circuit by which the relay FSR is picked up includes front contact 228 of relay ASTK (see FIG. 3H), front contact 229 of relay LNP, front contact 230 of relay ENP, wire 231, back contact 232 of relay PSTR, back contact 266 of relay LCTR, front contact 267 of relay FSTR, wire 268, back contact 269 of relay 16.1-S LT, back contact 270 of relay 13.2-S LT, back contact 271 of relay 16.1 LT, front contact 272 of relay 13.2 LT, jumper 273, bus 274 and upper winding of relay FSR. The picking up of relay FSR establishes a stick circuit to maintain this relay picked up as long as the train is within the zone 13.2. This stick circuit includes front contact 251 of relay R2 (see FIG. 3F), wire 252, front contact 253 of relay ASTK, wire 254, front contact 255 of relay RSR, wire 256, front contact 275 of relay FSR and lower winding of relay FSR.

It will be noted that the pick-up circuit for the relay FSR as has been described includes jumper 273 (see FIG. 3B) in connection with a front contact 272 of the address relay 13.2 LT. It will also be noted that similar jumpers are associated with corresponding front contacts of each of the other address relays. It is therefore provided that by the selective positioning of these jumpers on each train, it is possible to limit the zones in which the train may execute a full speed control received from the control office.

This arrangement is to prevent full speed operation of the train in a zone having curved track, or other conditions out of the right of way wherein it may be considered unsafe and/or undesirable to permit the train to be operated at full speed. It may also be possible that some classes of trains may be required to be operated only at medium speed in certain zones, while other classes of trains may be operated at full speed through these zones. This can be accomplished by the selective positioning of the jumpers such as the jumper 273 in accordance with a program of operation to be set up for the several trains.

With reference to FIG. 4, energy is applied to the full speed terminal F of the Servo-Control and Regulator in accordance with the picking up of relay FSR by a circuit including front contact 102 of relay ASTK, back contact 103 of relay PR, front contact 104 of relay FSR and the full speed contact *f* of the vehicle speed contactor SG. Thus the train is operated at full speed through the zone 13.2 in accordance with the full speed control that has been designated by the CTC operator.

*Stop Control*

There are several different conditions under which the apparatus for the remote control of the train will cause the train to be brought to a stop. One of these conditions is a condition where the train fails to receive a proceed or full speed control tone from the control office upon communication of its identity and the identity of a location point when the location point is reached by the train.

To consider specifically circuits involved under this condition, it will be assumed that the train has been operated in the zone 13.2 under a proceed control, or a full speed control wherein the relay PRP of FIG. 3E is maintained in its picked up position. This relay is maintained energized through front contact 259 of relay PR as has been described, if the train is operated at medium speed; and if the train is operating at full speed, the relay PRP is energized through front contact 276 of relay FSR. The relay PR or the relay FSR that thas been maintained energized during passage of the train through the zone 13.2, is dropped away by the opening of its stick circuit at front contact 253 of the annunciator stick relay ASTK when this relay becomes dropped away upon the momentary energization of the annunciator relay ANR (see FIG. 3F). The picking up of annunciator relay ANR causes the dropping away of relay ASTK by the opening of its circuit at back contact 81. Inasmuch as the relay PRP is dependent for energization upon either the proceed relay PR or the full speed relay FSR being picked up, this relay is deenergized each time the train checks into a new zone, but because of it being made slow to drop away, the relay PRP is maintained picked up for sufficient time to obtain a new proceed or full speed control from the control office, and thus forestall an application of the brakes of the train. Should such proceed or full speed control not be received within a relatively short length of time after the train checks into a zone, the relay PRP becomes dropped away, and the dropping away of this relay causes the deenergization of the valve EPV to apply the brakes and bring the train to a stop. Valve EPV is maintained energized during the time interval when both relays PR and FSR are in their dropped away positions and when the relay PRP is maintained picked up by its slow drop away characteristic, in accordance with the energization of a circuit including front contact 277 of relay PRP, back contact 278 of relay FSR, back contact 279 of relay PR, wire 240, front contact 239 of relay RSR, wire 238, front contact 237 of relay ANRP and the winding of valve EPV. Upon the dropping away of the relay PRP, if a new control is not received, the valve EPV becomes deenergized in accordance with the opening of front contact 277 of relay PRP, and the train is brought to a stop.

Consideration will now be given to the condition under which a train is automatically brought to a stop in case of failure of the integrity check of either the annunciator communication apparatus or the intermittent inductive train control apparatus. As has been pointed out, each of these independent brake control systems is normally effective each time a train checks into a zone to set up a condition for initiating brake applicaiton which is forestalled only provided both systems function properly, and only provided that a proceed or a full speed control tone is communicated to the train from the control office immediately in response to the train having been registered into a new zone.

When the train approaches the location point at the entrance to the next zone in advance, an annunciator control is first communicated from the wayside location to the train as has been described. The picking up of the annunciator relay ANR (see FIG. 3F) causes the dropping away of the annunciator stick relay ASTK by opening its stick circuit at back contact 81. The dropping away of relay ASTK in turn causes the dropping away of the proceed relay PR or the full speed relay FSR (dependent upon which of these relays has been picked up) by the opening of front contact 253. Relay PRP is also deenergized at this time by the opening of front contact 258 of relay ASTK, but this relay does not become dropped away immediately because of the shunting of its winding by the capacitor 260. The slow drop away characteristic that is provided for the relay PRP is sufficient to provide time for the communication of a new proceed control from the control office to the train in response to the train being checked into the new zone by the energization of circuits that have been described. During this time interval, with the relays PR and FSR both in their dropped away positions and with relay PRP maintained picked up, the valve EPV is maintained energized as has been heretofore described.

As the train progresses further so as to communicate a stop control via the intermittent inductive train control inductor, the relays R1, R2 and R3 become successively dropped away according to the normal operation of the train control apparatus upon passing over a stop inductor. The dropping away of the relay R2 (see FIG. 3F), subsequent to the picking up of the annunciator relay ANR is required in order that the relay R2P (see FIG. 3E) may become picked up, and the picking up of relay R2P is required in order to provide pick up energy for the relay ASTK, which has been dropped away upon reception of the annunciator control. The relay R3P, however, must be picked up in order to close a pick up circuit for relay R2P, and the picking up of relay R3P is dependent upon the restoration of relay R3 to its normally energized position. The relay R3 becomes picked up at this time, dependent upon the energized condition of the annunciator relay ANR. The circuit for energization of the relay R3 includes front contact 280 of relay ANR, wire 281, front contact 282 of relay FSR connected in multiple with front contact 283 of relay PR, wire 249, winding of relay R3, ballast lamps LL and primary winding P of the receiver REC. Upon the picking up of relay R3, the relay R3P becomes picked up by the energization of a circuit including front contact 166 of relay R3, wire 167, front contact 284 of relay PR connected in multiple with front contact 285 of relay FSR and back contact 169 of relay MCR.

The energization of relay R3 causes the energization of relays R1 and R2 because these relays are energized by the voltage drop across the relay R3. The relay R1 is picked up first to close its contact 250 and thus condition a circuit for picking up relay R2. Upon the picking up of relay R3P (see FIG. 3E), and prior to the picking up of relay R2, the relay R2P becomes picked up by energization of a circuit including front contact 158 of relay ANR, (see FIG. 3F), contact 159 of relay R2 in its deenergized position, wire 160, and front contact 161 of relay R3P. Upon the picking up of relay R2P, relay ASTK becomes picked up upon the closure of a circuit for its lower winding including front contact 164 of relay R2P. It will be noted that the annunciator relay ANR maintains the relay R2P picked up until the annunciator relay ANR becomes dropped away, and upon the dropping away of the relay ANR, a stick circuit which has been described for the relay ASTK is closed through back contact 81 of relay ANR to maintain relay ASTK steadily energized. This checks that the relay ANR is restored to its normally deenergized position. The picking up of relay ASTK is required in order to provide a circuit for the energization of the valve EPV, and thus the failure of this relay to be restored to its picked up condition causes the application of the brakes of the train after the relay PRP has had time to be dropped away upon the discharge of its associated capacitor 260.

If relay ANR should fail to be picked up in the communication of a stop control from the wayside to the train, the train would be brought to a stop, irrespective of the communication of a new proceed control from the control office, by the intermittent inductive train control apparatus. This is because the picking up of relay R3 after passage over the inductor is dependent upon closure of front contact 280 of relay ANR (see FIG. 3F). Thus the brakes would become applied after the dropping away of relay PRP (see FIG. 3E) in accordance with the opening of the circuit for the valve EPV at front contact 277. It is thus provided that a check is made on the integrity of the communication of a stop control by the annunciator apparatus each time the train enters a zone.

Similarly it is provided that if the relays R1, R2 and R3 fail to be dropped away by the intermittent inductive train control apparatus, the relay ASTK remains deenergized after having been dropped by the opening of back contact 81 of relay ANR (see FIG. 3F). The dropping away of relay ASTK under these conditions causes the dropping away of the relay PR or the relay FSR that has been energized, and after a time, the relay PRP becomes dropped away to remove energy from the valve EPV by the opening of front contact 277 to cause application of the brakes of the train. It will be noted that the dropping away of relay ASTK also removes energy from the Servo-Control and Regulator (see FIG. 4) upon the opening of front contact 102 so that the relays LP, MP and HP are all in their dropped away positions, and thus their front contacts cannot provide an energizing circuit for the valve EPV at this time.

From the above described mode of operation, it will therefore be readily understood that the train is brought to a stop, irrespective of any controls communicated from the control office, because of a failure of a stop control to be communicated either by the annunciator stop communication apparatus or by the intermittent inductive train control apparatus.

It is further provided that an operator can cause the stopping of a train at any point along the right of way, as at a station platform, for example, upon manual disignation of a stop control on the control panel of the CTC control machine. This is accomplished by actuation of the manual control lever GL for the next location point in advance of the train to its center position, corresponding to a stop control, and then actuating the start push button SPB for the zone in which the train is located. Thus if he wants to send a stop control to the train No. 104, for example when it occupies zone 13.2, he actuates the lever 18 GL (see FIG. 7B) to its center position to cause the dropping away of the relay 18.2 RGZ, and he actuates start button 13.2 SPB to cause the picking up of the change relay 13.2 CH, and to permit the picking up of relay 13.2 LCT by energization of a circuit including contact 292 of push button 13.2 SPB. Thus a cycle of operation of the code communication system is initiated for the transmission of a selectively modulated pulse to train No. 104 in the zone 13.2. The pulse is modulated with a stop tone in accordance with the energization of the stop bus wire 293, through back contact 192 of relay 18.2 RGZ and through front contact 191 of relay 13.2 LCT.

With reference to FIG. 3D, the reception of the stop control on the train causes the momentary energization of relay RSTR and the dropping away of the normally energized stop control relay RSR. This relay is normally maintained picked up by a stick circuit including back contacts 294, 295 and 296 of relays RSTR, ENP and LNP connected in multiple and front contact 297 of relay RSR. Upon the reception of the stop control, the relays ENP and LNP are picked up for the duration of the pulse in accordance with checking that the pulse received is for that particular train and for occupancy of the zone 13.2. Thus the relay RSR becomes dropped away, and the dropping away of this relay opens the circuit for the energization of the valve EPV at front contact 239 to cause application of the brakes of the train. It will be noted that the dropping away of relay RSR opens the stick circuit for the proceed relay PR and for the full speed relay FSR so that the relay PR or FSR that has been energized for progress of the train becomes dropped away, and thus the Servo-Control and Regulator (see FIG. 4) becomes de-energized.

It will be readily apparent from the above described mode of operation that any train can be brought to a stop at any point along the right of way in accordance with the designation of a stop control by an operator as has been described. It is to be understood, however, that such a stop is in accordance with the will of an operator, rather than involving the stopping of the train when it is unsafe to progress further, and that the braking of a train in accordance with traffic conditions in advance is full automatic as has been described, and does not require the action of an operator to designate a stop control.

*Check Out*

It has been pointed out that the checking out of an occupied zone is accomplished in this embodiment of the present invention by the checking into the next zone in advance. Thus the checking into the zone 18.2 by eastbound train 104 is effective after having registered its presence in the zone 18.2 to check-out of the zone 13.2. Thus the relay 18.2 TRX (see FIG. 6B) becomes dropped away in response to the dropping away of relay 13.2 P1 104, and with the relay 18.2 CIRP 104 in its picked up position, a circuit is closed to restore the relay 13.2 P1 104 to its picked up position. This circuit includes front contact 286 of relay 18.2 TRXP, back contact 287 of relay 18.2 TRX, front contact 288 of relay 18.2 CIRP 104, back contact 289 of relay 18.2 P1 104, wire 290, and winding of relay 13.2 P1 104. The picking up of this relay establishes a pick up circuit for the relay 13.2 TRX upon the closure of front contact 63, and the picking up of relay 13.2 TRX causes the picking up of its repeater relay 13.2 TRXP. The picking up of relay 13.2 P1 104 opens the stick circuit for relay 13.2 CIRP 104 at back contact 151 to cause that relay to become dropped away. Thus the registration of the occupancy of the zone 13.2 has been cancelled, and the train has been registered as occupying the zone 18.2. A similar mode of operation is effective as the train progresses further, eastbound trains being routed by the spring switches on the main track associated with passing sidings, and westbound trains being routed through the passing sidings in accordance with the positions of the spring switches.

*Change in Direction of Traffic*

As has heretofore been pointed out, the CTC operator can control the direction of operation of the train, in accordance with the selective actuation of the push buttons FPB and BPB of FIG. 7D for respectively designating forward and reverse directions for operation of the train. It is further provided that the operator can cause the transmission of a control to stop a train at any time by first positioning the lever GL to its center position for the next location point in advance of the train and then depressing a start button SPB as has been described.

If it is assumed that a train has been stopped in a zone, as the stopping of a train at a station platform, the CTC operator can cause the initiation of operation of the train in either a forward or a backward direction by selectively actuating the forward and backward push buttons FPB and BPB (see FIG. 7D) in combination with actuation of the start push button SPB for the zone which is occupied by the train. The mode of operation in the modulation of a pulse transmitted to the train in accordance with the forward or reverse designation is accomplished by mode of operation which has been described. The reception of the pulse by the train No. 102 in zone 13.2 provides for the energization of the forward and backward control relays FDR and BDR selectively.

The energization of the relays FDR and BDR of FIG. 3D is conditional upon the preconditioning of jumpers shown in FIG. 3B. The positioning of these jumpers, which are provided for the respective zones for an eastbound train is in accordance with whether or not it is desirable that an operator be permitted to reverse the direction of a train within the several zones. In other words, these jumpers protect the train against the possibility of improper control in accordance with the condition of the track layout by an attempt by an operator at the control office to reverse the direction of traffic at an improper time. It will be noted, however, that the jumper 298 is closed to provide that the train can be responsive to change in direction when occupying the zone 13.2. A circuit for energization of relay FDR (see FIG. 3D), for example, includes front contact 228 of relay ASTK (see FIG. 3H), front contact 229 of relay LNP, front contact 230 of relay ENP, wire 299, back contact 300 of relay 16.1–S LT, back contact 301 of relay 13.2–S LT, back contact 302 of relay 16.1 LT, front contact 303 of relay 13.2 LT, jumper 298, wire 304, back contact 305 of relay BRTR, front contact 306 of relay FRTR, back contact 110 of relay LCR and upper winding of relay FDR. The picking up of relay FDR causes energization of the forward control mechanism as is illustrated in FIG. 4 in a manner which has been described. At the same time that the forward control is received on the locomotive, a proceed control is also received and the relay PR of FIG. 3E is picked up by a mode of operation that has been described, thus permitting the release of the brakes and the initiation of operation of the train in the designated direction. In accordance with the picking up of the proceed relay PR, the stop control relay RSR (see FIG. 3D) is restored to its normally energized position by energization of a circuit including back contacts 294, 295 and 296 of relays RSTR, ENP and LNP respectively connected in multiple, wire 307, front contact 308 of relay PR and wire 309a. The closure of stick contact 297 shunts front contact 308 of relay PR out of the circuit just described.

Manual Control

Although it is contemplated the trains will be remotely controlled normally as has been described, without operators, provision is made for the operation of the trains by operators if such operation is at times desired.

To facilitate the operation of the trains by the operators, cab signals can be provided as is illustrated in FIG. 3E so that the operator may be advised as to the condition of the control apparatus on the train. If a full speed control is in effect for the train, the lamp FS of the cab signal is illuminated by the energization of a circuit including back contact 309 of relay MCR, front contact 310 of relay R3P and front contact 311 of relay FSR. If a medium speed control is registered for operation of the train, the lamp MS is energized in the cab signal through front contact 312 rather than the energization of the lamp FS as has been described. If the control office remote control apparatus has conditioned a control to stop the train, the lamp STOP is energized through back contact 309 of relay MCR, back contact 310 of relay R3P, back contact 313 of relay LCR and back contact 314 of relay PRP. If the train is under control of the local operator wherein the local control relay LCR is in its picked up position, the lamp LC in the cab signal is illuminated by energization through front contact 313 of relay LCR. If the train is under manual control by an operator on the train, the manual control relay MCR is in its picked up position, and thus the manual control lamp MAN in the cab signal is illuminated in accordance with the closure of front contact 315 of relay MCR.

For an operator on the train to take over operation of the train, he actuates the manual control push button MCPB (see FIG. 3F) to cause the picking up of the manual control relay MCR (see FIG. 3E). Relay MCR is picked up by the energization of a circuit including contact 316 of push button MCPB, front contact 317 of relay R3 and wire 318. Upon the picking up of relay MCR, a stick circuit is closed to maintain this relay picked up including front contact 258 of relay ASTK and front contact 319 of relay MCR. The picking up of relay MCR removes energy from the lamps of the cab signal, except from the lamp MAN, by the opening of back contact 309. It will be noted that the picking up of the manual control relay MCR effectively over-rules control by a local control operator, if such control has been established, by the opening of back contact 86 in the stick circuit for the relay LCR to cause that relay to be dropped away. As is illustrated in FIG. 4, the picking up of relay MCR in accordance with manual control can cause operation of the train only at medium speed. This is because of the application of energy through front contact 320 to the medium speed terminal M of the Servo-Control and Regulator for operation of the train at medium speed. The picking up of relay MCR opens the circuit at back contact 116 for the control of the forward and reverse controller 114 because it is considered that the direction of operation of the train would be determined by the manual controller (not shown) on the train rather than being controlled remotely from the control office by a mode of operation which has been described. It is also contemplated that the application of energy through front contact 320 of relay MCR for the energization of the Servo-Control and Regulator includes selections for stopping the train at will and other selections as required as is indicated by XX in this control circuit.

It will be noted that the relay MCR (see FIG. 3E) is dependent for stick circuit energization upon the energized condition of the annunciator relay ASTK, which is dropped away each time the train checks into a new zone. It is thus required that an operator actuate his manual control push button MCPB each time the train enters a new zone so as to reenergize his manual control relay MCR.

Having described one embodiment of a remote control system for vehicles provided according to the present invention, it is to be understood that various adaptations, alterations and modifications may be applied to the specific form shown in accordance with the requirements of practice within the spirit or scope of the present invention, except as limited by the appending claims.

What I claim is:

1. A system for the remote control from a control office of a vehicle upon passage along a right of way having a plurality of spaced locations comprising, a plurality of independently operable brake initiating means partly at each spaced location and partly on the vehicle for communicating by independent control apparatus respective stop controls from the associated location to the vehicle for causing application of the brakes of the vehicle each time the vehicle passes a location irrespective of the presence of vehicles in advance, proceed control means responsive to the presence of the vehicle at each location for obtaining a distinctive proceed control signal on the vehicle from the control office if there is no vehicle immediately in advance for rendering said apparatus ineffective to initiate a brake application, and means for rendering said proceed control means effective dependent upon the integrity of each of said brake initiating means upon passage of the vehicle at each location.

2. A system for the remote control from a control office of a vehicle according to claim 1 wherein one of said brake initiating means employs an inert inductor at each location point and apparatus on the vehicle subject to actuation upon passing over the inductor.

3. A system for the remote control from a control office of a vehicle according to claim 1 wherein one of said brake initiating means includes tuned circuits for the communication of a stop control from each wayside location to the vehicle at a predetermined frequency.

4. A system for the remote control from a control office of a vehicle according to claim 3 wherein said brake initiating means includes a sweep frequency transmitter on the vehicle.

5. A system for the remote control from a control office of a vehicle according to claim 3 wherein the brake initiating means includes at least one wayside coil tuned to a predetermined frequency.

6. A system for the remote control from a control office of a vehicle according to claim 4 wherein the brake initiating means includes a plurality of wayside coils at each location tuned to different frequencies.

7. A system for the remote control from a control office of a vehicle upon passage along a right of way having a plurality of spaced locations comprising, a plurality of independently operable brake initiating means partly at each location and partly on the vehicle for communicating controls independently from each location to the vehicle for initiating application of the brakes of the vehicle when the vehicle passes that location, checking means on the vehicle effective upon passage of the vehicle past each location for checking the integrity of each of said brake initiating means, means responsive to the passage of the vehicle past each of the locations for communicating the identity of the vehicle and the identity of the location to the control office, means responsive to the reception of the identity of a vehicle and the identity of a location at the control office for transmitting a proceed control to that vehicle, and means on the vehicle for rendering said brake initiating means ineffective to apply the brakes upon reception of a proceed control from the control office, said proceed control being rendered effective selectively in accordance with the condition of said checking means.

8. A system for the remote control from a control office of a vehicle according to claim 7 wherein there are two independently operable brake initiating means.

9. A system for the remote control from a control office of a vehicle according to claim 8 wherein said checking means is distinctively conditioned upon failure of either of the two independently operable brake initiating means to communicate a stop control at a location.

10. A system for the remote control from a control office of a vehicle according to claim 9 wherein said checking means includes a normally energized relay that is deenergized upon communication of a stop control from a location to the vehicle by one of said initiating means and is reenergized upon communication of a stop control by the other of said initiating means.

11. A system for the remote control from a control office of a vehicle according to claim 10 wherein the power operation of the vehicle is dependent upon the energized condition of said relay.

12. A system for the remote control from a control office of a vehicle upon passage along a right of way having a plurality of spaced location points marking the ends of successive zones comprising, brake initiating means partly at each of the location points and partly on the vehicle for communicating stop control signals from the associated location to the vehicle for causing application of the brakes of the vehicle each time the vehicle passes a location point, address registration means partly at the location points and partly on the vehicle responsive to the passage of the vehicle past each of the locations for communicating the address of that location point to the control office, occupancy registration means at the control office responsive to said address registration means for registering the occupancy of the zone by the vehicle, said occupancy registration means being effective upon registration of occupancy at the control office in one zone to cancel occupancy registration for the next zone in the rear, control means responsive to the registration at the control office of occupancy of the vehicle in a zone that has been entered for communicating a proceed control to the vehicle, and means effective upon reception on said vehicle of a proceed control for rendering said brake initiating means ineffective to apply the brakes of the vehicle.

13. A system for the remote control from a control office of a vehicle according to claim 12 wherein said control means cannot be rendered effective to communicate a proceed control to the vehicle if the next zone in advance is registered at the control office as being occupied.

14. A system for the remote control from a control office of a vehicle according to claim 12 wherein said control means cannot be rendered effective to communicate a proceed control in response to receiving an address registration from a vehicle unlses a proceed control has been manually designated at the control office.

15. A system for the remote control from a control office of a vehicle upon passage along a right of way having a plurality of spaced location points marking the ends of respective zones comprising, identity apparatus partly at the location points and partly on the vehicle for registering on the vehicle the identity of the last zone entered by the vehicle, communication means responsive to registration by said identity apparatus upon entering each of the zones for transmitting the identity of the vehicle and the identity of that zone to the control office and for communicating from the control office selected control energy signals indicative of selected speeds and direction of vehicle operation for governing the progress of the vehicle, and selecting means responsive to the registration on the vehicle of each zone entered by said identity apparatus for selectively limiting the number of different controls which can be effective for governing the vehicle in accordance with the particular zone the vehicle has entered.

16. A system for the remote control of a vehicle according to claim 15 wherein said selective control means is operable to permit a full speed control signal to be transmitted from the control office to the vehicle only provided the vehicle has entered a particular predetermined zone.

17. A system for the remote control of a vehicle according to claim 15 wherein said selective control means is operable to permit a full speed control signal if received on the vehicle to be executed to control the vehicle upon reception from the control office only provided the vehicle is registered as having entered a particular predetermined zone.

18. A system for the remote control of a vehicle according to claim 15 wherein said selective control means permits signal energy for reversing the direction of operation of the vehicle to be executed upon reception from the control office to control the vehicle only provided that the vehicle is registered as having entered a particular predetermined zone.

19. A system for the remote control selectively from a plurality of control offices of a vehicle upon passage along a right of way divided by a plurality of spaced location points into a plurality of adjoining zones comprising, means for communicating control energy to the vehicle for selectively operating the vehicle from each of the control offices, and means partly on the vehicle and partly at the location points for rendering the control of the vehicle responsive to control energy communicated from the control offices selectively in accordance with the particular location point last passed by the vehicle.

20. A system for the remote control of a vehicle according to claim 19 wherein the vehicle is controlled from the several control offices by space radiation, each control office transmitting to the vehicle at a different carrier frequency.

21. A system for the remote control of a vehicle according to claim 20 wherein communication apparatus provided partly on the vehicle and partly at one of the control offices provides for the selective forward and backward operation of the vehicle in accordance with manual designation at said one control office.

References Cited in the file of this patent

UNITED STATES PATENTS

| | | |
|---|---|---|
| 1,805,167 | Fitzgerald | May 12, 1931 |
| 1,882,027 | Nicholson | Oct. 11, 1932 |
| 1,930,920 | Bodde | Oct. 17, 1933 |
| 2,439,862 | Preston | Apr. 20, 1948 |
| 2,458,361 | Field et al. | Jan. 4, 1949 |
| 2,508,169 | Jones | May 16, 1950 |
| 2,509,632 | Field | May 30, 1950 |
| 2,588,931 | Kendall | Mar. 11, 1952 |
| 2,636,113 | Deloraine | Apr. 21, 1953 |
| 2,641,688 | Adams | June 9, 1953 |
| 2,883,521 | Curry | Apr. 21, 1959 |